(12) United States Patent
McDonough

(10) Patent No.: US 8,798,585 B2
(45) Date of Patent: *Aug. 5, 2014

(54) SYSTEM AND METHOD FOR ENHANCED COMMUNICATIONS VIA SMALL DATA RATE COMMUNICATION SYSTEMS

(71) Applicant: Shorthand Mobile, Inc., La Jolla, CA (US)

(72) Inventor: John G. McDonough, La Jolla, CA (US)

(73) Assignee: Shorthand Mobile, Inc., La Jolla, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/740,038

(22) Filed: Jan. 11, 2013

(65) Prior Publication Data

US 2013/0124211 A1 May 16, 2013

Related U.S. Application Data

(63) Continuation of application No. 12/122,619, filed on May 16, 2008, now Pat. No. 8,374,636.

(60) Provisional application No. 60/938,969, filed on May 18, 2007, provisional application No. 60/938,965, filed on May 18, 2007.

(51) Int. Cl.
*H04M 1/725* (2006.01)
*H04L 12/58* (2006.01)
*H04L 29/08* (2006.01)
*G10L 15/22* (2006.01)
*H04M 3/493* (2006.01)
*H04M 3/42* (2006.01)

(52) U.S. Cl.
CPC ................ *G10L 15/22* (2013.01); *H04L 51/38* (2013.01); *H04L 12/5895* (2013.01); *H04M 2203/556* (2013.01); *H04L 67/306* (2013.01); *H04M 2207/18* (2013.01); *H04M 2203/355* (2013.01); *H04M 2203/254* (2013.01); *H04M 3/493* (2013.01); *H04M 3/42382* (2013.01)
USPC .................... 455/412.1; 455/412.2; 455/413; 455/414.1; 455/414.2; 455/414.3

(58) Field of Classification Search
USPC .............. 455/412.1–414.3, 456.2–456.3, 466
See application file for complete search history.

(56) References Cited

U.S. PATENT DOCUMENTS 5,802,526 A 9/1998 Fawcett et al.
6,597,918 B1 * 7/2003 Kim .............................. 455/466

(Continued)

FOREIGN PATENT DOCUMENTS

KR 10-2005-052796 A2 6/2005
WO 02/087098 A1 10/2002

(Continued)

OTHER PUBLICATIONS

Extended European Search Report for related EP application No. 08755794.8, mailed Mar. 15, 2013, in 7 pages.

(Continued)

*Primary Examiner* — Dai A Phuong
(74) *Attorney, Agent, or Firm* — Procopio, Cory, Hargreaves & Savitch LLP

(57) ABSTRACT

A system and method for interacting with an interactive communication system include processing a profile associated with an interactive communication system; generating a user interface based on the processing of the profile to solicit a user response correlating to a response required by the interactive communication system; receiving the user response via the user interface; updating the user interface using the profile based on the user response; and sending a signal to the interactive communication system based on one or more user responses.

27 Claims, 4 Drawing Sheets

(56) References Cited

U.S. PATENT DOCUMENTS

| | | |
|---|---|---|
| 7,027,571 B1 | 4/2006 | Cook |
| 7,027,990 B2 | 4/2006 | Sussman |
| 7,068,643 B1 | 6/2006 | Hammond |
| 7,136,478 B1 | 11/2006 | Brand et al. |
| 7,277,691 B1 | 10/2007 | Lundy et al. |
| 2001/0014615 A1 | 8/2001 | Dahm et al. |
| 2002/0097848 A1 | 7/2002 | Wesemann et al. |
| 2003/0007464 A1 | 1/2003 | Balani |
| 2003/0030671 A1 | 2/2003 | Cobb et al. |
| 2003/0074198 A1 | 4/2003 | Sussman |
| 2003/0112931 A1 | 6/2003 | Brown et al. |
| 2003/0125042 A1 | 7/2003 | Olrik. et al. |
| 2003/0172067 A1* | 9/2003 | Adar et al. ............ 707/7 |
| 2004/0111269 A1 | 6/2004 | Koch |
| 2004/0120479 A1 | 6/2004 | Creamer et al. |
| 2004/0121814 A1 | 6/2004 | Creamer et al. |
| 2004/0122941 A1 | 6/2004 | Creamer et al. |
| 2004/0215526 A1 | 10/2004 | Luo et al. |
| 2005/0047559 A1 | 3/2005 | Colson et al. |
| 2005/0117725 A1 | 6/2005 | Baker |
| 2005/0201544 A1 | 9/2005 | Book et al. |
| 2005/0208892 A1* | 9/2005 | Kotola et al. ............ 455/41.2 |
| 2006/0013369 A1 | 1/2006 | Reynolds |
| 2006/0036493 A1* | 2/2006 | Aufricht et al. ............ 705/14 |
| 2006/0068861 A1 | 3/2006 | Triestram |
| 2006/0239252 A1 | 10/2006 | Kantak et al. |
| 2006/0239422 A1 | 10/2006 | Rinaldo, Jr. et al. |
| 2007/0264977 A1 | 11/2007 | Zinn et al. |
| 2007/0298819 A1 | 12/2007 | Hronek et al. |
| 2009/0061943 A1 | 3/2009 | Kamgaing-Kouam |
| 2010/0022270 A1* | 1/2010 | Mikkelsen et al. ........ 455/556.1 |
| 2010/0220842 A1 | 9/2010 | Thenthiruperai |
| 2012/0041961 A1* | 2/2012 | Norton et al. ............ 707/754 |

FOREIGN PATENT DOCUMENTS

| | | |
|---|---|---|
| WO | 2004006043 A2 | 1/2004 |
| WO | 2004047415 A1 | 6/2004 |

OTHER PUBLICATIONS

International Search Report and Written Opinion for PCT/US2008/064012 dated Aug. 28, 2008 in 11 pages.

\* cited by examiner

SYSTEM AND METHOD FOR ENHANCED COMMUNICATIONS VIA SMALL DATA RATE COMMUNICATION SYSTEMS

RELATED APPLICATIONS

This application is a continuation of U.S. patent application Ser. No. 12/122,619, filed May 16, 2008, which claims the benefit of priority of U.S. Provisional Pat. App. No. 60/938,969, filed May 18, 2007, entitled "System and Method For Communicating With Text Messaging Systems" and U.S. Provisional Pat. App. No. 60/938,965, filed May 18, 2007, entitled "System and Method for Communicating with Interactive Service Systems" all of which are hereby incorporated by reference.

BACKGROUND

1. Field of the Invention

The present invention relates to communication with interactive service systems, such as service systems that use short message service (SMS), interactive voice response (IVR) systems, and websites or other data systems.

2. Related Art

Many companies currently use interactive service systems, such as text messaging systems and IVR systems for various tasks as a first line of customer support and service. However, interacting with such systems can be cumbersome and time consuming.

New methods and systems are desired to drive awareness and increase discovery by users of such interactive systems available in communication systems. There is also a need to simplify the creation of text messages needed to access information and content and perform various transactions. In addition, improved methods for displaying results and confirmations provided in response to request and transaction messages sent to text-messaging systems are desired.

SUMMARY

Certain embodiments as disclosed herein provide for a system and method for enhanced communications. One example described herein relates to communications using a short message service (SMS) available on most digital mobile phones facilitating short messages (also known as text messages, messages, or texts) from and to mobile phones, other handheld devices, and server systems. However, each reference to SMS is also intended to apply to other communication protocols and systems such as data channels and voice communications interacting with interactive voice response systems.

In one aspect a method for interacting with an interactive communication system includes processing a profile associated with an interactive communication system; generating a user interface based on the processing of the profile to solicit a user response correlating to a response required by the interactive communication system; receiving the user response via the user interface; updating the user interface using the profile based on the user response; and sending a signal to the interactive communication system based on one or more user responses.

Additionally, the can include determining from the profile whether the user response requires the signal to be sent to the interactive communication system.

Further, the step of sending a communication can include causing the generation of a text message.

The step of processing a profile can further comprise executing a profile processing application.

In another aspect, a system for interacting with an interactive communication system includes: a profile processing application which processes a profile associated with an interactive communication system; a user interface module configured to at least: generate a user interface based on the processing of the profile to solicit a user response correlating to a response required by the interactive communication system, receive the user response via the user interface, process the user response, and use an updated user interface to be generated; and a sending module which sends a signal to the interactive communication system based on the user response.

In a further aspect, the profile processing application is configured to determine from the profile whether the user response requires the signal to be sent to the interactive communication system. Additionally, the sending module can send a signal to an intermediate server which in turn sends a signal to the interactive communication system.

In a further aspect, a method for interacting with an interactive communication system includes: processing a profile associated with the interactive communication system; generating a user interface based on the processing of the profile to solicit a user response correlating to a response required by the interactive communication system; receiving a user response via the user interface; generating and transmitting a communication to the interactive communication system based on the user response; receiving a communication from the interactive communication system; and updating the user interface using the profile, based on the communication from the interactive communication system.

In further aspects, the method can includes determining from the profile whether the user response requires the signal to be sent to the interactive communication system and saving user entered information and modifying the profile using the saved information.

A further aspect includes a method of communicating with a client device having a profile processing application and a profile including: receiving a text message from the client device; accessing information associated with a user of the client device; transmitting a responsive message to the client device; and transmitting additional information to be displayed at the client device based on at least the information associated with the user.

Other features and advantages of the present invention will become more readily apparent to those of ordinary skill in the art after reviewing the following detailed description and accompanying drawings.

BRIEF DESCRIPTION OF THE DRAWINGS

The details of the present invention, both as to its structure and operation, may be gleaned in part by study of the accompanying drawings, in which like reference numerals refer to like parts, and in which.

DETAILED DESCRIPTION

Certain embodiments as disclosed herein provide for a system and method for enhanced communications. One example described herein relates to communications using a short message service (SMS) available on most digital mobile phones facilitating short messages (also known as text messages, messages, or texts) from and to mobile phones, other handheld devices, and server systems. However, each reference to SMS is also intended to apply to other communication protocols and systems such as data channels and voice communications interacting with interactive voice response systems.

After reading this description, it will become apparent to one skilled in the art how to implement the invention in various alternative embodiments and alternative applications. Although various embodiments of the present invention are described herein, it is understood that these embodiments are presented by way of example only, and not limitation. As such, this detailed description of various alternative embodiments should not be construed to limit the scope or breadth of the present invention as set forth in the appended claims.

The following overview of the text-messaging environment is intended to provide a general and high level understanding to the reader. This overview is in no way intended to define the entire scope of or limit the scope of the text-messaging environment.

While the present disclosure refers to the Short Message Services (SMS) physical information channels available in substantially all cellular systems, other physical information channels also available in cellular systems may be employed. For example, packet data services available in many cellular systems are also enabled in a high percentage of the mobile terminals operating within these systems. Accordingly, an increasing number of users are subscribing to the associated packet data services which can also be used in embodiments described herein.

Those skilled in the art will recognize the applicability of the embodiments described herein and will be capable of readily migrating the systems and methods described in this disclosure relative to an SMS information channel to other information channels (including packet data channels and via instant messaging "IM"). Many improvements to the system and methods due to the higher data rates and potential for more frequent connections between the clients, servers and systems will be readily apparent.

Figure 1:
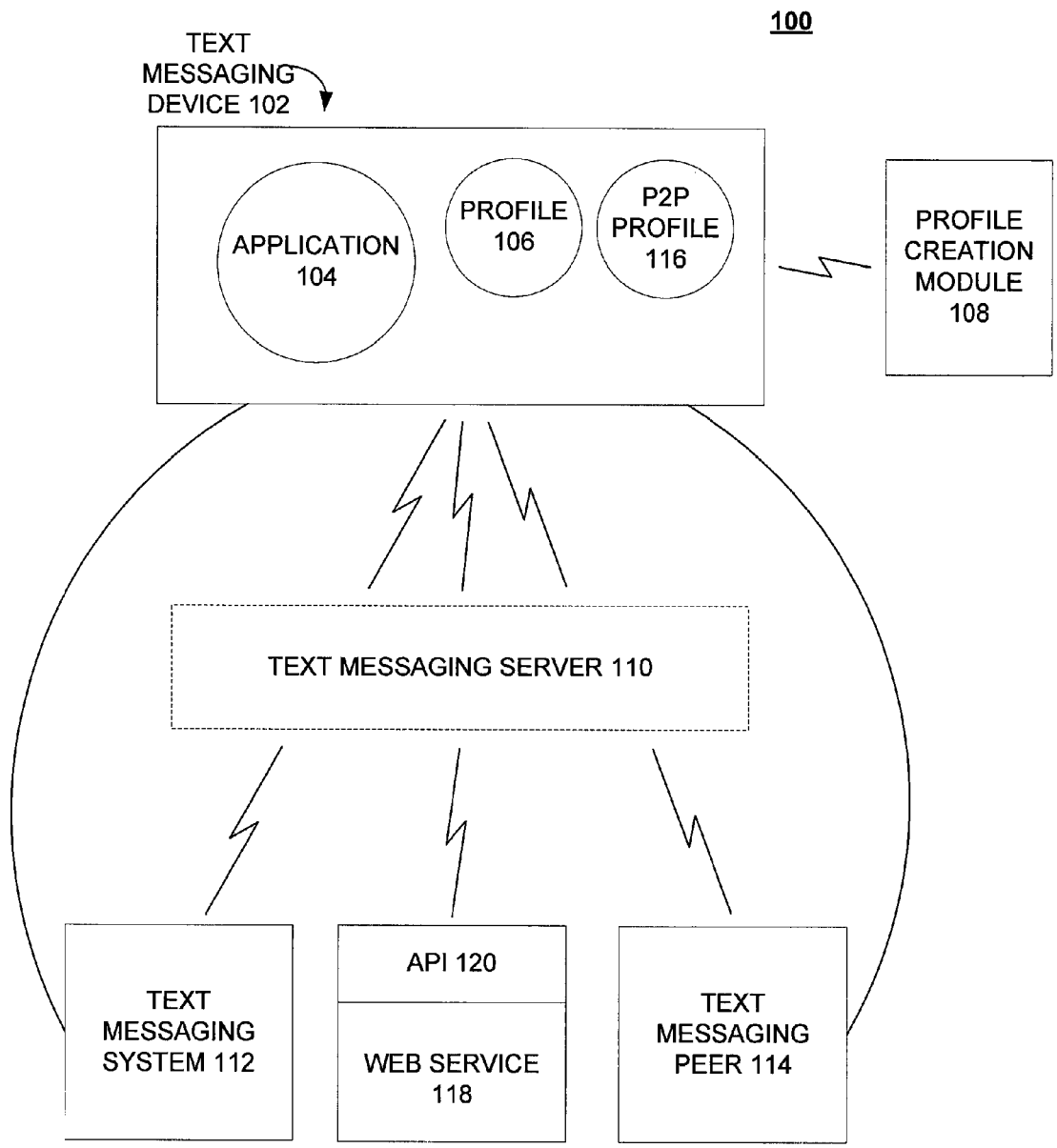
FIG. 1 is a block diagram of a text messaging environment according to one embodiment of the invention.

Referring now to FIG. 1, a block diagram of a communication environment 100 according to an embodiment of the invention is shown. The environment 100 includes a text-messaging device 102 (also referred to a client), and one or more text messaging servers 110, one or more text messaging systems 112, a web service server 118, and a text messaging peer 114. The text messaging device 102 includes an application 104 (i.e., profile processing application) and one or more profiles 106, which is associated with the text messaging system 112. Though in the examples discussed herein, the focus is on a single example profile, it is anticipated that most devices will include more than one profile 106.

In an embodiment, the application 104 and profile 106 are initially loaded on the text messaging website/server 110. A user may download the application 104 and any profiles 106 of interest from the server 110 wirelessly, or via a personal computer ("PC")

The profile creation module 108 allows a designer to enter and select profile description information. In one embodiment the designer can be the user of device 102. However, the designer will also be other users with access to the creation module 108 with such access being provided in a number of ways including via the internet. Included may be information describing menu structure, branding information and images, attributes, keywords, codes, short codes, sent message formats, received message formats, display information for received messages, user input prompts, and value range information. In an embodiment, the profile creation module 108 generates the profile in eXtensible Markup Language ("XML").

The device 102 can exchange text messages directly with the text message system 112, and/or a text message peer 114. Alternatively, the text-messaging server 110 can stand in between the text message system and the text message peer. In this embodiment the text message server 110 receives text messages (intended finally for text-messaging systems or text-messaging peers) from users, read and modify (e.g., monitors, adds to, removes from, changes, compresses, uncompresses, etc.) the text messages and forward the resulting text messages on to the text-messaging systems or text-messaging peers. The text-messaging server may also receive text messages (intended finally for persons) from text-messaging systems or text-messaging peers, read and modify (as per above) such text messages, and forward the resulting the messages on to such persons.

Additionally, the text message server 110 can receive text messages from the device 102 which are intended or result in a response from a non-text message system. For example, the web service server 118 can provide information or services via a web browser or other API 120. The text messaging server 110 can receive a text message from the device, reformat the message into a format compatible with the API 120 of the web service server 118 and transmit that query to the web service server 118, for example, via the internet. The server 110 can then receive the response from the web service server 118, reformat that response as a text message and transmit that text message back to the device 102. In this manner, device 102 can access services and information via server 110 that are not otherwise available via text messaging.

Examples of a text-messaging device 102 include a cellular phone, an Internet protocol ("IP") phone, a landline (e.g., cordless) phone, a wireless fidelity ("WiFi") phone, a voice over IP ("VoIP") phone or other phone, and a wireless device or computer. The text-messaging device 102 includes an application 104 and a profile 106. The application 104 can be a software application targeted initially to reside on the text-messaging device 102. The application 104 and the profile 106 can provide, for example, greatly improved user interfaces (UIs) for those who wish to interface with a text-messaging system 112 (e.g., an SMS system like Google SMS or other systems like the Internet or a computer database, etc.). In other embodiments, the text-messaging system 112 can be an interactive voice response (IVR) system or other interactive communication system and therefore, the text-messaging system 112 can be more generally referred to as an interactive response system that can use various communication protocols and channels.

In "person to machine" (P2M) situations, the application 104 together with the profile 106 (described below) creates a user interface (UI) which can include a graphical user interface (GUI) for accessing a text-messaging system 112 (e.g., an SMS based weather, stock, ring tone download or banking system). The entire set or a subset of options supported for the text-messaging system 112 are presented to the user in a simple and easy to navigate set of menus, user input prompts, and output screens providing requested user information, confirmations, and error messages all described in the profile 106 associated with the text-messaging system 112. The application 104 in combination with one or more profiles 106 simplifies and enhances the user experience and thereby saves time and minimizes user entry errors. The systems and methods described herein can leverage thousands of existing and future text-messaging systems while taking full advantage of existing text-messaging device 102 features (e.g., cellular phone features, SMS send/receive capabilities, audio, keypad, display, processor, memory, wireless connection, etc.).

The application 104 also provides a user interface (UI) allowing a user to efficiently communicate with another user (e.g., a text-messaging peer 114), where the other user may or may not also have the application 104 running on their text-messaging device 102. In such "person to person" (P2P) or "peer to peer" communications, one or more users can take advantage of several beneficial features provided by the application 104. When all parties sending and receiving text messages are utilizing the application 104, all such users derive the greatest benefits in the use of the application. The users may communicate with each other using any of several P2P profiles 116, each of which may offer numerous features common to all profiles, and other features specific to certain profiles.

With the high level of user adoption and interest in SMS text services in the US and elsewhere in the world, users may find many and varied ways to leverage the profiles. Individual users and user groups, therefore, may create and customize profiles for purposes of creating individualized and customized P2P experiences to suit their interests. Such behavior may accelerate user adoption of the text-messaging environment.

Examples of capabilities, among others, which may be included into P2P profiles 118, are described below.

Received emoticons (e.g., ":)") can be converted to graphical representation (e.g., ☺). Codes may be sent and received within text messages allowing the user to select and control avatars. The avatars may be loaded as part of the P2P profiles. A user in a group of users communicating with the aid of a P2P profile 116 may have an avatar to represent each other user in the group. The user may also have an ability to control an avatar representing the user when the user's avatar is viewed by the other users.

Text shortcut phrases (e.g., "r u there") can be converted to full text versions (e.g., "are you there").

Text messages may be sent conditionally, according to received text messages based on either or both the phone number or short code of the original sender, or on the message contents. A user can configure the application 104 and a profile 106 such that a desired text message or a text message containing certain information or data is sent in response to a particular message received from another person or text-messaging system 112. For example, the user may configure a message including the text "Hello Anne, I am in a meeting all day today, but will call you tonight." to be sent in response to each message received from a user with phone number 858-123-4567.

Compression (information source coding techniques known to those skilled in the art) at the sending user's application 104 and un-compression at the receiving user's application 104 can more efficiently utilize available messaging bandwidth. Such compression allows for the addition of advertisements and coupons at the text-messaging server 110 while still allowing the user's access to 160 characters of payload.

Menu trees relevant to user groups may be utilized in the generation of text messages to be sent to one or more group members. For example, a menu tree can allow a member of a "Fantasy Football" league to select a set of teams from a predefined list of team names stored in the P2P profile 116. A menu tree can enable a member of a "Chess Club" to send the text corresponding to a chess move (e.g., K2K5) to an opponent in the Chess Club. Members of social groups, clubs, affinity groups, etc., can develop many and varied ways to leverage the application 104 and profiles to improve communications between and among members of the group.

Creating and maintaining lists of group members and corresponding phone numbers is simplified. Members can use such a P2P profile 116 to efficiently address text messages to one or more members of the group. Additional groups and sub-groups can also be created.

Entry shortcuts (described herein) corresponding to members of a group, including aliases, etc., can be created. Similarly, entry shortcuts for words and phrases of interest to members of a group (e.g., a list of product codes for use by a group of field sales representatives) can be created.

UI menu trees providing for efficient generation of text forms of interest to the group can be utilized.

In an embodiment, a profile creation module 108 (described herein) can be used to create a P2P profile 116 with any of the features described above, and others. The profile creation module 108 may be made available on a website/server or elsewhere. Alternatively, a P2P profile 116 may be created using information related to the application 104 (described herein) without the use of a tool such as a profile creation module 108.

After the P2P profile 116 is created, the members of a user group may then use the application 104 and the associated P2P profile 116 together as a primary client. The P2P profile 116 would be tailored to benefit the user group. To facilitate communication between all users of the user group, including those who do and those who do not have the application and associated profile, the application may appropriately and conditionally prepare the text messages to be sent and appropriately and conditionally process the text messages received. Additionally, the user can use the P2P profile as their preferred messaging client whether they have created any groups. That allows for a generalized customized and improved messaging or communication interface.

To facilitate such conditional processing, the application 104 and associated P2P profile 116 on a first user's text-messaging device 102 have information corresponding to an associated P2P profile (if any) on other user's text-messaging devices 102. For example, if a first user has an application 104 and P2P profile 116 capable of performing source code compression in the generation of messages to be sent and one of the intended receivers of the message does not have the required un-compression capability, then the application 104 sending the message may decide not to perform any compression. Alternatively, the application 104 may decide to send a compressed version of the message to a text-messaging server 110, which then performs a compression appropriate for intended recipients having an un-compression capability.

In some cases, messages sent from one member to another member of a group using a P2P profile may be sent via the text-messaging server 110 so that further processing may be performed at the server 110. Some example processing steps are described below.

A text message is received from a sender at the server 110, information (e.g., advertisement information) is added to the text message, and the text message with the added information is sent to the intended receiver.

A compressed text message is received from a sender at the server, the received compressed message is un-compressed, and the uncompressed message is sent to the intended receiver, which does not have a capability to un-compress a message. In such a case, the message may be sent in multiple parts.

Additionally, a message can be sent from the user to the server 110. The server then sends the message to multiple other people. For example, the sender may provide along with the message, the name of a predefined group to send the message on to. The server will in this case read the name of the group, look up the addresses of each member of the group, and send the message on to each member of the group. This saves time on the part of the sender and eliminates the need for the sender to send multiple messages. Instead only one message will be sent from the client to server, reducing potential tariffs. Other examples related to compression (for purposes including minimizing the number of text messages sent and received, to reduce potential tariffs for sending and receiving) will be apparent to those skilled in the art.

The application 104 may save certain user inputs as "entry shortcuts," and propagate appropriate values within the device 102 to various profiles (e.g., P2P profile 116 and profile 106) so that the user is not required to enter them again. Time is thus saved because the user need not otherwise recall the information (e.g., zip code, city name, a bank account number or credit card number, etc.) from another location (e.g., a credit card in the user's wallet, etc.).

Complete entry sequences may be saved as "sequence shortcuts." A user may later select a sequence shortcut from a first menu list. The application 104 then automatically runs through the desired entry sequence for the user, prompting the user when certain variable entry information is required. Sequence shortcuts may initially be placed in an initial menu of the profile 106, or may be moved by the user to the initial menu of the application 104, or to the screen/desktop of the text messaging device 102.

The application 104 can automatically re-order each menu list by frequency of use so that the user sees the most frequently used menu items at the top of the list. This feature may be enabled or disabled by the user at any time. The user may also revert to the original ordering for any profile using the application. The application also allows the user to rename menus and profiles, to hide them, to delete them and to unhide them.

Application

The application module 104 resides on the text-messaging device 102. The application 104 is typically downloaded in the form of executable software to the text-messaging device 102 from the text-messaging website/server 110 or another website/server wirelessly or via a PC. The application 104 interfaces with features and functions available on the text-messaging device 102 through a device application programmer interface (API). The API may be a BREW (binary runtime environment for wireless), JAVA, Linux, Microsoft Mobile, or other API and may use features and functions available on the text messaging device 102 not available through such API(s). The application 104 reads and interprets one or more profiles 106 selected by the user and provides a user interface (UI) to the user in the form of a set of menus, user input prompts, and displays of outputs of requested user information and confirmations, in accordance with the profile 106. Typically, the application will present the user with the list of profiles available on the text messaging device 102 when the user initially launches the application 104. The user then typically selects one profile from such list at which time application 104 reads and interprets such profile as described above.

The application 104 does not generally contain information specific to any particular text-messaging system but may contain in certain specific situations as required. The information specific to a particular text-messaging system (or other communication system or protocol) is typically contained in a profile 106 developed in accordance with message formats required by the text-messaging system. The application 104 in effect provides a second API (i.e. the "API") on top of the device API described above, where the API supports profiles 106 themselves as "applications." Thus, functionally is partitioned into two distinct components. In the first, the application 104 is dependent on the specific device API (e.g., BREW) supported by the particular text-messaging device 102. In the second, the profile 106 is substantially independent of the API supported by the particular text-messaging device 102, and is specific to and dependent on the API provided by the application and also on the associated text-messaging system. This partitioning can afford several important advantages. For one, profiles may be used on any text messaging device 102 on which application 104 resides. So one profile may be developed for a particular text-messaging system and such profile will operate on many different text messaging devices 102 which may use various device APIs (e.g. BREW, JAVA, Microsoft Mobile, or other API). Therefore the applications which are enabled using the profiles may be developed for broad deployment much more quickly and for much less cost than similar applications which would need to be designed and "ported" to operate on each individual device API. In addition, new profiles or modified versions of existing profiles may be developed over time and such profiles will inherently operate within any text messaging device 102 for which application 104 is resident, with no additional development or "porting" required.

This partitioning enables a user to download a single application 104 adapted to the API supported by the user's device 102. The user can then download multiple profiles 106, where the profiles 106 are independent of the device API. That is, the same profiles 106 may be downloaded by other users onto devices having different device APIs. This capability allows for the development of profiles 106 independent of current and future text-messaging device APIs.

This approach is very scaleable from the perspective of the providers of a text-messaging systems, who desire text-messaging device clients to support their particular text-messaging systems. In an embodiment, without the text-messaging system as described herein, providers would need to develop a specific client for each device API intended for support. In one embodiment, profiles 106 may contain image files (e.g., .png files) dependent on the text-messaging device because of screen size and aspect ratio dependencies, etc. An application 104 may also write information into the profile 106 in order to change or add to the information contained in the profile 106 (e.g., to rename a menu item, to add a shortcut or to maintain statistics, etc.).

The application 104 can communicate with the Text Messaging server 110. In one embodiment, portions of the text messages to and from the device 102 and the server 110 that are not used for a text message (referred to as the "control channel") can be used to provide additional communication between the application and the server. Messages sent in the control channel can include, for example, the following: User has deleted a profile; user is requesting a new profile; reporting user profile usage statistics such as which profiles have been used and how often; server-to-client new dynamic advertisement; client reports ad displays, ad clicks, and ad events; server-to-client remote disable of application or sending of informational message to user; confirmation that application has been disabled; instructing application to enable, disable, hide or unhide a profile; confirmation that a profile has been enabled, disabled, hidden or unhidden; reporting certain user events which are identified in the profile as being required to be reported from the client to server, reporting user initiation of URL or phone call during interactivity with a received SMS message; sending an "I am alive" message from application from watch dog function described below; and instructing the application to hide or disable a profile; instructing the application to modify a profile. These and additional messages may be sent in the control channel to and from the device 102 and the server 110 as requirements and needs arise over time.

There can also be included one or more message queues for the control channel. For example control channel messages can be classified to be sent immediately, including by a dedicated control channel text message if no control channel is otherwise available. Other control channel messages can be classified as high priority, medium priority or low priority and sent out according to that priority ranking as control channel capacity is available. Typically when a text message is sent based on a user initiated action, the availability and capacity of the control channel is evaluated and control channel messages which are in such queues described above are sent to the extent the control channel has available capacity to do so, in accordance with their priority ranking. Thus, the high, medium and low priority queues will be emptied in respective order. The application may evaluate the elapsed time since being queued for messages assigned various priority rankings and if such messages have been queued for more than a defined time period of time associated with such priority ranking, such messages may be sent out by a dedicated control channel text message. Various other algorithms and methods may be used to effectively transmit control channel messages of different priorities over time as will be apparent to one skilled in the art.

The application 104 provides functionality for modifying profiles 106 resident on a user's text-messaging device 102. The instructions for such profile modification may be provided via the control channel. A menu item may be added to an exiting menu list in such a way. For example, a menu list containing the items "California", "New York" and "Idaho" may be modified to also include the menu item "Nevada" according to such methods. The specific control information for the addition may include among other data, information to identify the profile, the menu list within the profile, the menu item text and the data to be sent in the text message corresponding to the selection of the added menu item.

The application 104 can maintain an application inbox of messages received in connection with the profiles 106 resident on the device 102. This inbox can be separate from or a sub-set of the text message inbox for the standard client of the device 102. For example, the operating system of the device 102 can be configured to place all incoming messages into the inbox based on a list of sender addresses or a part of the "to" address or based upon information in the message. Additionally, messages in the inbox can be associated with their related profile for activation when an item in the inbox is accessed. For example, this can allow for incoming alert messages associated with a profile to be processed according to information in the profile. The application inbox may also allow the user to sort such inbox message contents by the time and date of arrival of such messages. When reading a particular message associated with a particular profile within the application inbox, the user may be given the option to open or execute the associated profile with a single menu option selection so as to facilitate ease use. Alternatively, accessing the message can automatically cause execution of the profile. The application inbox may provide header information for each message when the user is in a message list view of the application inbox. Such header information may provide, among other information, the profile name, query type (e.g. "Movies by zip") and message arrival time and date so that the user may conveniently view the application inbox contents.

Additionally, profiles can also be used to forward a received in one communication protocol in another protocol. All messages received in a protocol for which a profile is present can be trapped in the inbox. For example, the user may have several profiles for sending or forwarding messages in various formats or protocols (e.g. Twitter, Facebook, and AIM). The user may have received a message on AIM (IM message). The user is looking at the message in the Inbox. The user wishes to send the message to another person, but this person does not have an AIM account/screen name. Instead the user has a Facebook account. So the user reads the message from AIM and does a forward from the Inbox. In the forward command, the user id given the option to forward via several options (SMS/text, Facebook, AIM, Twitter). Basically each profile corresponding to one of the options et which offer messaging will be have an associated option for the use for forward operations. The user may decide to forward the AIM message in the Inbox to the friend using Facebook messaging. When creating a new message in the Inbox, the user is also given options as to how to send the message (e.g. Via AIM, Twitter, Facebook, SMS/text, etc.). The profiles themselves are not used directly in the forward and new message options above. Instead, for each profile that the user has downloaded, the "messaging" option for that profile in effectively "plugged in" to the Inbox to allow messaging from the Inbox. This makes for a very convenient centralized messaging place (the Inbox) from which the user may access any of the messaging options available to the user (based on the profiles the user has loaded into the application).

The application 104 and profiles can be made available to the user for specific time periods, for example, for providing subscription license arrangements and additional access control over the application 104 and profiles for other purposes. This can include attaching, to the application and/or profiles, data corresponding to the download date and data corresponding to a period during which the application or profile is to remain valid. The application 104 is capable of monitoring such information and the current date to cause a particular profile 106 to expire or to cause the application 104 itself to expire. Further, the application can disable a profile in response to a control channel or text message, e.g., from the server 110 and can disable itself.

Additionally, once a profile is loaded, the user may receive a notification via a text message or in the control channel (e.g., from the server 110) indicating that a new version of the profile is available. The user may then select a URL link in the text message which takes the user to a WAP site or website which prompts the user to download the profile. Alternately, the application may receive the text message indicating that a new version of the profile is available and the application may automatically go to the URL by opening a web browser. The application may then initiate the download of the profile automatically. Note that all of the above also applies when the received text message notification is not for a new version of an existing profile, but instead for an entirely new profile for the user. In such a case the user may have already agreed to receive such profile when available.

Advertisements may be placed by the application at appropriate screens within the menu tree or UI. Two types of advertisements are provided, those chosen by the application (static) and those chosen in real time by the text messaging server 110 (dynamic). Dynamic ads can also be chosen and provided by the text messaging system 112 in the same manner as the server 110. Based upon specific placement categories, the static advertisements are chosen by the application from a small on-line database of ads downloaded at the same time as the application or included in the application or in the profile.

Advertisements may be placed by the application at appropriate screens within the menu tree or UI. Two types of advertisements are provided, those chosen by the application (static) and those chosen in real time by the text messaging server 110 (dynamic). Dynamic ads can also be chosen and provided by the text messaging system 112 in the same manner. Based upon specific placement categories, the static advertisements are chosen by the application from a on-line database of ads downloaded at the same time as the application or included in the application and updated from time to time either in part or in entirety through various means including when the user downloads a new or updated profile, downloaded automatically by the application 104 or downloaded through the control channel when available. The application and/or profiles may contain sets of images relating to advertisers (e.g. advertiser's logos). The advertiser images stored on the device will typically be those associated with the advertisers whose ads are placed most frequently within the application and profiles. These images may be loaded with the initial application load or when profiles are loaded or may arrive in the control channel. When a dynamic or static ad is placed by the application, the advertiser image (if available) may be placed adjacent to the ad text by the application. If not available, then the ad text will be placed without an advertiser image. Each advertiser images may be stored along with a unique index number. The dynamic and static ads may also contain such advertiser image index number, so that advertisements and advertiser images may be correctly associated and paired for display.

In contrast, dynamic ads are selected in real-time by the text messaging server 110 when the client device sends a request to the text messaging server or when a alert or other asynchronous text message is sent from the server to the client or as a dedicated server to client control channel message. The selected dynamic ad can be sent to the device 102 on the control channel. Dynamic ad selection can be very specifically targeted based upon the client request and/or other criteria. The other criteria can include information from a user's profile (e.g., sex, residence address) usage history, time of day, etc. For example, an ad for a theatre can be provided when the user sends a movie times query; an ad for a real estate agent can be provided when the user sends a query requesting information on a home at a particular address; an ad for a sporting event can be provided when the user sends a related sports scores query. The advertisement databases that the text messaging server can choose from may or may not be contained within the text messaging server, but may, instead or in addition, reside on one of more separate server. Such selected advertisement may then be included within the response to the query (in the control channel) and sent back to the user where such advertisement may then be placed within or adjacent to the response to the query received by such user. Each profile 106 can contain information as to categories (e.g., a profile for accessing movie listings may be designated as being in the "Entertainment" category) of ads to be placed within such profile menu system or UI. Advertisements may also contain information as to categories for placement (e.g., an advertisement may be designated for placement in the "Airline" category and the "Entertainment" category). Advertisements may also contain information as to specific profiles for placement (e.g., an advertisement may be designated for placement in the "Pizza Hut" profile and the "Google" profile). Advertisements may contain information as to specific categories or profiles for non-placement (e.g., an advertisement may be designated not to be placed in the "Pappa John's" profile and not to be placed in the "Sports" category). Various other algorithms and methods may be used to effectively select ads for placement as will be apparent to one skilled in the art.

In one embodiment dynamic ads are sent in the control channel and can contain the following information:

ad text: (e.g. "Half off 4 tires at 4 Day Tire Store")

ad ID: This is used to uniquely track the ad from creation through display, click and actioning in the phone. The ad ID is passed back to the server when these events take place so that the server knows which ads were displayed, clicked and actioned. This information is maintained on the server for analytics and billing purposes. The display, click and actioning counts are also used to stop the sending of dynamic ads when the maximum allowable counts (if applicable) are reached.

mode: This is the display mode of the ad text, e.g., scrolling or stationary.

actionable options mask: Refers to actions resident in the application/phone; e.g. Call Advertiser, Goto website, Get Coupon, Download Now, etc. Any number of these is possible. Having the mask (i.e. referencing the options rather than sending them) allows for more compact ads. If the desired action is not available the ad can contain "custom actions". The custom text (e.g. Get Event Details or Enter Coke Drawing) is sent in the control channel with the ad.

Static ads can be stored on the device 102 (e.g., in profiles or other files associated with the application as described above. Each stored ad can contain the following information: All of the above information defined for dynamic ads plus the following which can be used by the application to determine ad placement:

start date and expiration date maximum number of times to place the ad. Can also control the maximum number of times to allow the ad to be clicked and/or actioned.

list of profile names in which the ad can be placed and/or list of profile categories in which the ad can be placed.

Once a static or dynamic ad is displayed, clicked or actioned within the application, a control channel message may be sent from the client to the server 110 to indicate this event. The advertiser may choose for each such ad click or action (including any or all of the selected actions or customer actions), to have a specific response message sent to the client 102. (An actionable item is an item that a user can select, for example by clicking.) For example, the response to the action "Get Coupon" may be to send a message with a coupon "code" and details for redemption. Also, the response to the action "Enter Coke Drawing" may be to send the message "You have been entered to Win a one year supply of Coke". Any number of other ad responses is possible and may be created by the advertiser. The ad response may also contain a link to a website for purposes of downloading a ring tone, mobile phone application, or other downloadable file. An ad response may also contain a coupon code, or a UPC or other code which may be rendered into a graphical image representation by the application so as to allow the application to display such UPC or other code in the form of a coupon which is then human or machine readable and which may be scanned for redemption. Such coupon codes may in some cases be returned in a control channel portion of the ad response which is not intended to be viewed by the user, but instead rendered as described above into a graphical coupon image for redemption.

The application includes a watch dog timer feature which periodically sends a message, for example, a text message or control channel message, to inform the server 110 that the application 104 is still loaded and active on the device 102. There are several reasons that it is important to be able to detect the application is still resident on the device. If the user has deleted the application from the device, the server 110 does not want to continue to send information alerts to the user. In addition, the server does not want to expose the control channel format to the user which may occur if the application is not resident on the phone and the phone receives text messages containing the control channel and when there is no application 104 to intercept such messages. If the user has deleted the application from their mobile, control channel messages sent to the device could be captured in the device's standard SMS client therefore exposing the control channel message to the user. Similarly, if the user has switched to a phone that has an older version of the application installed, the server does not want to send control channel messages that may not be supported by the older version. In order to detect the two situations described above, the watch dog feature of the application sends at least one SMS message to the server in each of recurrence of a defined time period. As a result, if no queries are sent to the server from the device within such defined time period, the application will send a special "I'm alive" message to the server. In addition, the "I'm alive" message will contain the version of the application in order to detect if the user has switched phones to a phone with a different version of the application or has installed another version of the application. If no communications are received from a device at the server in each recurrence of such defined time period, it is assumed that the application is no longer installed or temporarily disabled by the user (e.g. by the user turning the phone off) and the server will immediately stop sending messages to such device. Should the server once again begin receiving communications from such device, it is assumed that the application has been re-enabled by the user and the server will immediately begin allowing the sending of messages to such device, including sending some or all of the messages which were not sent during the period in which the device was considered to be disabled by the user or uninstalled.

The application 104 may send the text-messaging device 102 user's current location in a message query in the control channel (via, for example, latitude/longitude, ZIP code, City Code, Airport Code, or other location identification means) either automatically or under user control when such location information is available and may enhance the query or response information. In an embodiment, the user's current location (e.g., ZIP code) may be presented to the user within certain displays, sometimes as an entry shortcut, for the user to select as one of several options when creating a query. The user may select such current location, may select another location available as an entry shortcut or may enter yet another location in an entry box made available to the user.

The application 104 can monitor and track types of events and activities. These events can be monitored on the client, recorded and then sent back to the server 110, for example, via the control channel. Some are single events and some are an accumulation of events over a time period. Some may be sent immediately while others may be sent at a later time, using the available control channel queues. These events and activities are as follows:

1) Profile usage. For example, how many queries the user sends from each profile. This usage is accumulated over a collection period (e.g. 1 day or 1 week, etc.) which is programmable per profile. When the time period expires, the sum of queries sent from the particular profile is put along with other information (date stamp, profile name or ID, etc.) into a control channel message and put into a queue for sending to the server. The next collection period begins at the end of the prior collection period. Changes in this method are possible, including monitoring the usage of specific queries or groups of queries within a profile. For example if a profile offers weather, news and stock quotes, the application can monitor the usage of each query type and send all 3 separate query sums to the server after each collection period expires. In another example, the application can also monitor the number of query responses and/or the number of unsolicited messages (e.g. Weather alerts) received during the collection period. Such profile usage accounting is needed when monetization is a function of the number of users or active users using for a particular profile. The above information is also valuable for analytics purposes.

2) Advertisement events. The application can monitor when ads (static and dynamic) are displayed to the user and when they are clicked. The application provides for a landing page which provides a list of one or more actions available to the user once the ad is clicked. Any such action taken is also monitored. Some ad actions listed are programmed into the application and selected for use using information provided along with the ad. For example the actions may include (Call Advertiser, Go to Advertiser website, Have advertised call me, Opt-in to SMS, Download Now, Enter to Win, Request Coupon, etc.). Some ad actions may be provided along with the ad (e.g. "Call Crest"). These are called "Custom Actions". The application records ad display events, ad click events and ad action events. When recording ad actions, the specific action taken is also recorded (e.g. "Request Coupon"). These events are all put along with other information (date stamp, time stamp, profile name or ID, ad ID, ad action details, etc.) into a control channel message and put into a queue for sending to the server. The Call Advertiser action, in addition to being recorded, causes a call to be placed to a number which is provided along with the ad. The "Go to Advertiser website" action, in addition to being recorded, causes a URL address which is provided along with the ad to be accessed by invoking a browser. Ad display accounting is needed for advertising when monetization is a function of the number of impressions made. Ad click accounting is needed for advertising when monetization is a function of the number of ads which are clicked on. Ad action accounting is needed for advertising when monetization is a function of the number and type of actions taken. All such above information is also valuable for analytics purposes.

3) Call and URL events. The application monitors when phone numbers and URLs are clicked. Such phone numbers and URLs are made actionable (clickable) by the application when they appear in certain displays (in particular in the Display Action) as well as in the inbox among other places. The recording of such events may be controlled on a profile by profile basis, with such events recorded in some profiles and not recorded in other profiles. These events are all put along with other information (date stamp, time stamp, profile name or ID, ad ID, event details, etc.) into a control channel message and put into a queue for sending to the server. Call and URL event accounting is needed when monetization is a function of calls placed or URLs visited. The above information is also valuable for analytics purposes.

4) General events. The application provides the ability for a profile to indicate that the application is to monitor specific user actions, which may not fall into any of the above categories. This is done by inserting a Control Channel Action element within the profile menu system. This element is not visible to the user, but when the user takes certain actions, the Control Channel Action will be executed and certain information defined by the profile will be sent along with certain other information (e.g. date stamp, time stamp and profile name or ID) to the server using the control channel. The profile defined portion will typically be a string of information, used to indicate the action or event. For example, in the case of a profile which is used to place an order or perform a transaction, the profile may have a Control Channel Action immediately following the order or transaction confirming step in the process. This confirming action may be the sending of a confirming text message to the server or to a third party server. To the user this confirming step may be performed by selecting the option "Confirm Order" or "Confirm Transaction". In this way any number of actions or events may be recorded and passed to the server based on user activity concerning the profile of interest. This general accounting feature may be used when monetization is a function of the number and type of transactions or purchases made using a particular profile. This general accounting feature may be used for many other purposes. The above information is also valuable for analytics purposes.

The following summarizes some of the functions of the application.

1) Text messages may be formatted and sent.
2) Menu items may be renamed or deleted by the user.
3) Menu items may be hidden and unhidden by the user.
4) Entry shortcuts may be deleted or modified.
5) Entry shortcuts may have a nickname added to them by the user. For example the zip code entry shortcut "92037" may have the nickname La Jolla added to it. In such case the result may be displayed to the user as "La Jolla: 92037".
6) Entry shortcuts may have expiration information associated with them. For example, the entry shortcut information obtained by propagating a set of movie names from certain received messages which have arrived in response to a query for movie times information, may be assigned the expiration information "perishable" in which case such information will be deleted by the application on or after midnight of the day it was received.
7) User entry information may be saved (as an "entry shortcut") for the user for later use. In an embodiment, entry shortcuts show up in the entry menu in which the corresponding user entry information was entered.
8) Sequences of menu item selections and user entry information may be saved, named, and provided to the user at a later time so that the user may repeat all or some of the previously performed sequence by making a single menu selection (and if necessary, by entering information required to complete the sequence).
9) The above-described sequences may be scheduled by the user to be performed at a later time or times, including sending on a recurring basis (e.g. daily at 10:30 am).
10) The above-described sequences may be referenced as "sequence shortcuts" which are then placed in the program launch display of the text-messaging device 102.
11) The menu items in any or all menu item lists may be reordered automatically according to frequency of use so that the most frequently used menu item shows up as the first item in the menu list for the user. Such reordering may be stopped and/or removed (reverting to original order) by the user.
12) The menu items in any or all menu item lists may be reordered automatically according to most recently used so that the most recently used menu items shows up as the first items in the menu list for the user. Such reordering may be stopped and/or removed (reverting to original order) by the user.
13) Certain menu items may be restricted from reordering so as to remain as the first item or in any desired location within the menu list.
14) Entry shortcut information may be propagated from one entry menu to other entry menus in the same profile 106 and to entry menus in other profiles when such entry shortcut information is of the same information type as indicated by the profile.
15) Received text message information may be propagated to other entry menus in the same profile and to entry menus in other profiles.
16) User entry information may be tested for validity.
17) Multiple associated received text messages may be properly reordered if received out of order.
18) Multiple associated received messages may be concatenated into a single message to be displayed for the user.
19) Received messages may cause an "alert" pop-up to the user (e.g. "Message from Google has arrived") with options (e.g. "Dismiss" and "Read") so that the user may read such messages and be notified of their arrival.
20) Received messages may be reformatted for improved readability for the user (including the addition, removal and modification of information)
21) Messages may be compressed before being sent and may be un-compressed upon being received.
22) Received message information may be incorporated into the menu tree or UI to be displayed to the user after such message is received.
23) User input information may be subsequently incorporated into the menu tree or UI to be displayed to the user (e.g. after entering the zip code 92037, the user requesting weather information may see the display "Retrieving weather for 92037").
24) Placing dynamic and static advertisements at appropriate screens within the menu tree or UI.
25) Moving menu items from one menu to a prior or subsequent menu in order to simplify future menu navigation (e.g., moving the Sports menu item under the menu arrived at by selecting the Entertainment item to the same menu as the Entertainment item. In this example, Sports is advanced by one menu tree level and made more readily available with fewer clicks required by the user.

Profiles

Each profile 106 contains detailed information to describe a particular text-messaging system (e.g., the Google SMS system). This includes detailed menu tree and menu item information, details of user input requirements, and information as to the format of text messages to be sent and the format of any text message received from the text-messaging system. The profile 106 also contains the short code(s) of the text-messaging system.

A single profile 106 may not necessarily be used to communicate with only a single text-messaging system. Profiles may be created which interface to several text-messaging systems and/or to communicate with other types of systems using other communication channels and protocols. For example a profile 106 could be created which would access weather information from one text-messaging system and access stock quote information from another and video (via a data service) from another. The user may under some circumstances be made aware of the two separate text-messaging systems, or under other circumstances not be made aware that information is retrieved from two separate text-messaging systems. In a second example, a user can request a street address from one text-messaging system and then request driving directions to or from the street address from a second text-messaging system using the same profile 106. From the user's perspective, both operations are therefore conducted within the same user interface. A user accessing several text-messaging systems with several profiles thus benefits from the use of UIs that are substantially similar in look and feel. This similarity enhances the user's ability to access such systems effectively because it is required only to learn to use only one basic UI, even though the user is accessing several (perhaps dozens) of text-messaging systems and services.

Referring to the second example above, the user experience can be further enhanced if the street address is automatically provided to the user within the UI for accessing the driving directions without the user having to "copy and paste" the information from a received text message into a second text message which would be sent to request the driving directions.

Furthermore, when two such text-messaging systems involved in the above second example use different formatting information for a street address, for example, the application 104 with the profile 106 is configured to reformat the street address between the steps of retrieving the street address from the received text message and providing it to for use in the second query. This is a component of a feature which is generally referred to herein as "propagation." Additional components of the "propagation" features are described below.

The feature described in the example above in which information from a received text message is automatically available for use in composing another text message to be sent as part of another information request is not limited to situations in which the requests are performed using a single profile 106. Information and values entered by a user as well as information and values received by a user when accessing a profile 106 (associated with one or more text-messaging systems) may be made available within the same profile and may also be made available within other profiles which use the same type of data.

Information and values, both entered by a user and received by the user, may be defined to be of a specific "type" and be so described in the profile 106. The information and values of the "type" may then be made available to the user from the same or other profiles when the user is prompted to enter a value which is of the same such "type." For example, a user enters when prompted a value of "type" Credit Card Number in a particular profile 106 (e.g., for a banking service), where the profile 106 is configured such that this value is to be propagated to other profiles (i.e., by setting the appropriate attribute). If the user loads a second profile (e.g., a profile for SMS based ticket purchase) at a later time and the second profile prompts the user to enter a credit card value, then the credit card number entered by the user when accessing the first profile shows up for the user to select and enter. In the example above, the Credit Card Number information entered by the user will be propagated as described to other profile(s) and will also be made available to the user (as an "entry shortcut") within the entry screen in which the user was originally prompted for the value.

Information entered by a user according to a UI prompt when using a profile 106 may be made available immediately to the user when the user is still accessing the same profile. For example, with respect to a banking service profile, if a user enters an account suffix number to perform a savings to checking account transfer, the account suffix number may be made available when the user selects an option to retrieve account balance information within the profile. As described above, the text-messaging system allows a user to enter a value at one step within a particular profile and then to have the value available to the user at future times when the value is required within the same or different profiles. In this way a user entering values when using a first profile may not need to enter the values again, even when they are required to perform many further transactions using several profiles. In order to distinguish those values which should be saved as entry shortcuts in the entry screen in which they are entered from those values which are considered variable and should not be saved as entry shortcuts, the profile may contain information to distinguish each such value as fixed (in which case and entry shortcut will be created) and variable (in which an entry shortcut will not be created). While an account number once entered will likely be needed again and would therefore be considered fixed, a dollar amount for a savings to checking transfer may not be needed again and may therefore be considered variable. In order that information entered by the user and saved as an entry shortcut may be obscured for security purposes, the profile may contain information as to how such entry should be obscured when later displayed as an entry shortcut. In one example, this is accomplished by using the "*" symbol to hide certain digits of a Credit Card Number so that the resulting entry shortcut would be displayed as (e.g. "************7632").

The profiles provided to the user may be configured before download to include certain sequence shortcuts and entry shortcuts which may be deemed of interest to that specific user or to the majority of users or which may be requested by such user to be set up beforehand. For example, in a banking service profile, a sequence shortcut "Checking Balance" can be provided since it would seem that the checking balance information is a frequently selected information request for such a profile. Secondly, in the banking service profile, an entry shortcut "My Account: 123456789" (where "123456789" represents the user's actual account number) can be provided since it saves the user the time and potential for errors in entering the user's specific account number(s) later. Such information may be added to an existing generic version of such profile, once such profile is requested by a user and after such customization information is determined based on user account, registration and other information.

Entry shortcut and sequence shortcut information may be defined and entered into the profile 106 during the creation of the profile 106 using the profile creation module 108 or otherwise during the creation of the profile 106. Such information may be deemed of interest to the user therefore included in the profile at creation. The entry shortcut and sequence shortcut information may also be defined and entered into the profile 106 based on instructions provided by the user after profile creation and before the user downloads the profile 106 to the user's text-messaging device 102 (e.g., when the user selects the profile for download using the text-messaging website/server 110). The purpose of such user customization is desired in part in order to simplify the customization process by taking advantage of a website or other user interface which may be more convenient place for the entering of such information relative to doing so using the text messaging device 102.

The profile can contain information as to where, within the UI, to alert the user when responses or confirmations, etc. to queries or transactions, etc. arrive for the user. The profile 106 can contain information as to where, within the UI, dynamic and static advertisements or coupons are to be placed. The profile 106 may also include information as to the categories of queries and transactions, etc. to be accessed through the profile 106. The information may be used to decide which of available advertisements and coupons to place in the UI. For example, when accessing movie information, a Theater advertisement of coupon may be placed. Note that advertisements may be placed within UI elements of application 104 which are not explicitly part of a particular profile UI. For example, advertisements may be placed in the display in which the inbox message list view is provided or in the display in which individual inbox messages are viewed. In addition, advertisements may be placed in the display in which the profile list view is provided. There are numerous other displays within the application, which are not explicitly part of a particular profile UI in which advertisements may be placed.

Various file formats and data structures can be used to describe the UI and associated profile 106 which provides a user with access to the services provided by a particular text-messaging system, to generate the message formats required by the system and support and additional features described herein. In one embodiment, the profiles contain a set of attributes to describe the UI as a menu tree, and to describe the send and receive message formats, etc. The attributes may be generally grouped as profile level attributes, menu level attributes, menu item attributes, entry action attributes, display action attributes, etc. Within each such group, the attributes related to an associated part of the menu tree are listed. There are numerous methods for describing the UIs and associated profiles, which will be apparent to one skilled in the art.

Text-Messaging Server

While many text-messaging systems and services are available to users, users are not generally able to readily discover such systems and services because they are typically only described on websites provided by the text-messaging system 112 and service providers themselves. A text-messaging server 110 can simplify the discovery process for the user by aggregating many text-messaging systems and services, which can then be made available for discovery by the user on a single website. As noted above, the website can be the text messaging server 110, or it can be based on one or more other servers.

The user's discovery process is further enhanced by collecting information from the user regarding the user's demographic information, interests, mobile usage patterns, etc., for example, via the control channel as was described above. Basic demographic information (e.g., sex, interests, etc.) can be collected when the user registers with the server 110. The usage patterns and which profiles are used and how often each profile is used are collected as described below. From such information, the most appropriate text-messaging systems and services may be selected from the set of all such systems and services and suggested in various ways to the user. In one example, all available profiles may be offered to the user, organized by profile category in one view and organized by profile name in another view. Profiles may also be offered and listed in accordance with business rules with companies offering text messaging systems, where such rules consider promotion and premium placement, competitive considerations and the like.

A feature provided on the server 110 is a version of the profile creation module 108 (described in greater detail below). This version may be made accessible to text-messaging system 112 and service providers so that such providers may readily create profiles associated with their text-messaging systems. This feature facilitates a quick and efficient aggregation of a provider's content and allows for rapid generation of the associated profiles. This model is highly scaleable from the perspective of text-messaging services and content aggregation.

A related feature provided on the server 110 is another version of the profile creation module, which may be made accessible to users of the application 104. User may readily create profiles for use in peer to peer applications or for use with text-messaging systems for which the user desires further customization or for which no profile 106 is yet available. The user may begin with an existing profile 106, or create a profile 106 from scratch. This feature further facilitates rapid user adoption. This model is highly scaleable in terms of end-user customization and has clear potential for adoption by affinity groups, social groups, clubs, organizations and other groups and for social networking purposes. As such, this feature offers great potential for the "viral" adoption of the application.

Profile Creation Module

The profile creation module 108 may be run on a PC, a text messaging server 110, a text messaging system 112, and/or a web server, etc. The profile creation module 108 allows a profile designer, developer, text-messaging service or content provider, or end-user to create a profile 106 associated with a particular text-messaging system 112 or for peer-to-peer communication. Creation of a profile 106 is performed through a UI provided by the profile creation module 108, the UI including a set of forms, prompts, and entry fields used to receive the information to describe a particular text-messaging system 112. In an embodiment, the information includes send and receive message format information, text-messaging system short code(s), user entry prompts, information and constraints for error checking, and information pertaining to the desired UI, generally in the form of a menu tree.

The profile information, typically in the form of attributes, can be stored in XML or another file format. There can be one or more profiles for each supported text-messaging system 112 or set of systems. In an embodiment, profiles can be created through examination of the text message format and other information provided for users of the text-messaging system 112.

Depending on business or technical considerations, the text-messaging server 110 can include an intermediary server, which may be used to access certain text-messaging systems so that messages sent to and from particular text-messaging systems may be monitored and/or modified. Monitoring and modification can be performed, for example, for purposes of user and/or customer billing and audit records creation, call volume and statistics collection, profile version checking and control, user registration verification, error detection and correction, advertisement and coupon downloading, information downloading, and profile list and catalog updates.

Compression of information sent from the text-messaging server 110 to a user may be employed so that additional data bandwidth within such messages is made available for the insertion of advertisements and coupons and other information.

In an embodiment, the application 104 may append a version number of a profile 106 to a text message it sends. The text-messaging server 110 can compare this to the version number of the receiving text-messaging system 112 to determine if the profile 106 is out of date with respect to the receiving text-messaging system 112. If the profile 106 is out of date, the user may be prompted to update the profile 106 prior to sending a message to the receiving text-messaging system 112. For example, the user may receive an indication that the user's profile 106 is out of date with a request that the user download an updated profile. The user may be given the option to immediately request the updated profile, or to do so at a later time. The profile version checking may also be incorporated into the text-messaging system 110 itself without the need for version checking to be performed by an intermediary text-messaging server. The server 110 may also perform various authorization tasks. For example, a user may be authorized to access only certain text messaging systems and not others. In such a case, should a user attempt to access a text messaging system for which the user has not been authorized or is not longer authorized, then the server 110 may send a response to such user indicating the lack of authorization and may also provide information as to how to gain authorized access to such text messaging system. In a similar way, the text messaging server 110 may restrict access on a user by user basis. For example, a request from a phone number, which is not registered with the system 100, may be declined access to all text messaging systems which are accessed through text messaging server 110. In addition an application disable command may be sent to phone numbers for which are not registered with the system 100.

Other features may be implemented with the use of the text-messaging server 110. The text-messaging server 110 may be used to limit access to certain text-messaging systems by particular users under predetermined conditions (e.g., such text-messaging systems may be available to users only on a subscription basis or under some other access control). The text-messaging server 110 may also be used to store statistics related to the text-messaging transactions requested and performed. In an embodiment, the text-messaging server 110 may be used to store sensitive and/or confidential user information (e.g., a user's credit card number and expiration date, account numbers and passwords) so that the user is not required to send this information in the form of a text message. The text-messaging server 110 can use the information with other information sent by the user via text messages to complete purchases or other transactions or information requests.

In an embodiment, the application 104, when instructed by a user via a profile 106 to send requests to a receiving text-messaging system 112, instead sends the request (with any necessary routing information, such as a short code indicating the receiving text-messaging system, and other information) to the text-messaging server 110. The text-messaging server 110 receives the request, logs information required for billing and other purposes described above, performs any required modifications to the text message, and sends the modified version of the text message to the receiving text-messaging system 112.

In another embodiment, the application 104 may compose a text message for the text-messaging server 110, pre-pend to the message a short code indicating the text-messaging system 112, and send the complete message to the text-messaging server 110. The text-messaging server 110, upon receiving the text message, removes the pre-pended short code and sends the resulting message and original sender's phone number (i.e. the phone number for text messaging device 102) to the text-messaging system 112 indicated by the short code. The resulting message can be sent via another text message, via the internet, or via other means of information or data exchange. The text-messaging system 110 can then process the request and send any required confirmation, content, or other information to the user's text-messaging device 102 via a return text message(s).

The text-messaging system 112 may be configured to send such a return text message to the text-messaging server 110 so that the text-messaging server 110 may monitor and/or modify the return text message to provide information from the text-messaging server 110 to the application 104 on the user's text-messaging device 102 (e.g., advertising or coupon information or other information, etc.).

In an embodiment, the short code associated with the text-messaging system is a dedicated short code used only for messages sent from the application 102. Use of a dedicated short code allows the text-messaging system to treat messages received from the application 102 differently than those received directly from standard text-messaging device clients. This simplifies billing and accounting operations when such billing and accounting differs for messages sent from standard text-messaging device clients vs. messages sent from application 104. In addition, the text-messaging system may send text responses to the text-messaging server 110, rather than sending them directly to the test messaging device 102, when the response is associated with a request received from the application 104 using the dedicated short code.

The text-messaging system 112 may provide on a system-by-system basis for various message transfers. The text-messaging system 112 may provide that text messages be sent directly from a user's application 104 to the text-messaging system 112, and any return message be sent directly to the user's application 104. The text-messaging system 112 may also provide that text messages originating from a user's application 104 are sent to a text-messaging server 110, modified at the text-messaging server 110, and sent to the text-messaging system 112, and that any return message is sent directly back to the user's application 104. The text-messaging system 112 may further provide that text messages originating from a user's application 104 are sent to a text-messaging server 110, modified, and then sent to a text-messaging system 112, and that any return message is sent to the text-messaging system 112, modified, and sent to the user's application 104. Variations of the above methods will be apparent.

In another embodiment, instead of disposing the text-messaging server 112 between the text-messaging system 112 and the user's application 104, additional messages can be sent by the application 104 and the text-messaging server 110. For example, the application 104 sends the text messages as described above directly to the text-messaging system 112 and additional text message(s) directly to the text-messaging server 110. The additional message(s) may contain information for message tracking, billing, and accounting, a short code number indicating the text-messaging system 112, information about the type of request or transaction, profile version number, and other information which may have been stored by the application 104 for future forwarding. Any or all of the control channel information (described above) may be sent to and from the application 104 directly to and from text messaging server 110. Such information may or may not be related to the particular text-messaging system 112.

The application may in some cases utilize one or more of the text-messaging server options described above or may not use a server in other cases. The decision to send messages directly to the text-messaging systems or to send the text messages through a text-messaging server may be made on a profile-by-profile basis using information contained in the profile providing such indication of method or the decision may be made based on information contained in the application. This flexibility is convenient because some text-messaging systems may and some may not require that accounting and billing information be collected and for other reasons. In a typical situation a text messaging device 102 will contain some profiles which communicate directly with text messaging systems 102 and will also contain some profiles which communicate indirectly with text messaging systems 112 through text messaging server 110. Also, in such typical case, control channel messages and information are provided to and from the application 104 to and from text messaging server 110 even though some such control information will relate to the profiles which communicate "directly", some such control information will relate to profiles which communicate "indirectly" and some such control information will be independent of all such profiles.

The text-messaging server 110 may send text messages to the application 104 with further information (e.g., advertising and coupon information, and other information).

In an embodiment, the text-messaging server 110 provides text-based services itself. That is, the text-messaging server 110 acts as a text-messaging system 112 as described herein. The use of the text-messaging server 110 for text-based services effectively co-locates the functionality of a text-messaging system 112 and the text-messaging server 110. This configuration allows the text-messaging server 110 or a separate server to provide all or some of the same text-based services that are otherwise provided through third party text-messaging systems. For example, the text-messaging server 110 may provide weather information, stock quotes, sports information, chat services, taxi services, query services, information services, movie listings, search services, and other information and services. The configuration also allows third party parties to provide content and information to users. The content and information may be loaded onto the text-messaging server 110, or linked to the text-messaging server 110 using tools provided by a website/server and/or the text-messaging server 110.

In an embodiment, the text-messaging system 112 may provide text-messaging system information to users while acknowledging the brand providing the information, or alternatively, without acknowledging the brand providing such information.

Types of content and information which may be provided by the text-messaging system 112 include, but are not limited to:
1) information already available through third party text-messaging systems;
2) information available in the future through third party text-messaging systems;
3) the aforementioned information provided to the end-user both with and without consideration of the content or information provided;
4) information owned or licensed by the owners of the text-messaging system 112; and
5) information made available by third parties and deposited into or linked to the text-messaging server 110.

Profile and Application Download

Embodiments of the present invention provide for methods of loading profiles into a text-messaging device 102, and for locations where a user may access profiles for loading. Examples include, but are not limited to, the following:
1) One or more servers and/or websites (including the text messaging server 110) each provide a one or more profiles from which a user logged into the website may select from. Once selected, profiles are downloaded directly to the text-messaging device 102 over the air, or to the user's computer over the internet and then to the user's text-messaging device 102 using, for example, a serial, Bluetooth, USB, or other wired or wireless connection. In an example, loading a profile over the air includes: the user providing a device number for the user's text-messaging device 102, the website/server sending a text message containing a URL (pointing to the profile or profiles) to the text-messaging device 102, the user accessing the text message, selecting the URL, opening a mobile internet browser, and downloading the profile directly to the text-messaging device 102. Once loaded and appropriately disposed within the file system of the text-messaging device 102, the application 104 recognizes the new profile 106 and enables the user to access the text-messaging system 112 associated with the profile 106. In an example, a user logging into such a website can determine if a profile is available for a particular text-messaging system 112 by entering or searching for the phone number (short code) of the text-messaging system 112, the name of the corporation maintaining the text-messaging system 112, and/or by category (e.g. weather information, banking, airline, etc.). If such a profile is available, the user may load the profile as described. In another example, the user may grant the text-messaging website/server 110 access (e.g., using a text-messaging device client designed for that purpose) to the user's contacts list in the user's text-messaging device 102 so that the text-messaging website/server 110 can search for profiles available for any of the contacts (short code numbers) listed and offer the user an opportunity to download any or all of them to the user's text-messaging device 102. In addition to the profile 106, the application 104 may be provided if it has not yet been loaded onto the user's text-messaging device 102. In the case of the application 104, additional information including registration and payment information may be required from the user (e.g. text-messaging device 102 make and model, cellular operator, etc.). Demographic and other information may be requested from the user at such time.
2) The user receives a notification via a text message indicating that a new version of a profile already loaded on the text messaging device 102 is available. The user may then select a URL link in the text message to a Wireless Application Protocol ("WAP") site or website which prompts the user to download the profile. Alternatively, the application 104 may receive the text message indicating that a new version of the profile is available and the application 104 may automatically go to the URL using a web browser. The application 104 may then initiate a download of the profile automatically. In another example, the received text message notification is for an entirely new profile for the user. In this case, the user may have already agreed to receive such a new profile when it is made available.
3) A website or web page of a corporation provides a profile 106 for the corporation's text-messaging system 112. A user logged into such a website is allowed to retrieve the profile 106. In an example, a bank provides a page or link within the website which prompts the user for a device number of the user's text messaging device 102 and other information, and then allows the user to load the profile 106 for the bank's text-messaging system 112 over the air as described above, and/or allows the user to download the profile to the user's computer over the internet for later loading onto the user's text-messaging device 102. In addition to the profile 106, the application 104 may be provided if it has not yet been loaded onto the user's text-messaging device 102. In the case of the application 104, additional information may be required from the user (e.g. text-messaging device 102 make and model, cellular operator, etc.).
4) A corporation's website or web page provides a link to a website and to a profile 106 associated with the corporation's text-messaging system 112. A user then, for example, logs into the website (if they are already registered) and accesses the profile of interest, or is asked to register before being allowed access. The profile can then be downloaded over the air as described and/or downloaded using the user's computer over the internet for later loading onto the user's text-messaging device 102.

5) A text message is sent to a user's text-messaging device 102 (i.e. for such users who have previously installed the application). The text message may prompt the user to download a profile for a specific text-messaging system provider. The text message may then have a link to the specific profile, which is then loaded as described.

6) A text message is sent to the user in response to the user opting into a marketing program or other program with the text-messaging system provider. A text message may also be sent to the user in response to the user sending a text message requesting the profile in response to written instructions which may be found on a website, magazine or newsprint, television ad, etc. For example, a text-messaging system provider may provide instructions such as the following to users on a promotional flyer, poster, or menu (e.g., at the physical location of the text-messaging system provider): "Please text 'menu' to short code '12345' to have our mobile application sent to your phone" or "Please text 'menu' to short code '12345' to have the RESTAURANT mobile menu profile sent to your text-messaging device." Accordingly, the user sends an SMS using the short code of the text-messaging server 110 with a code/message corresponding to a request to download the profile. For example, a paper menu at RESTAURANT X may read: "Please send 'RESTAURANT X' to '12345' to receive the RESTAURANT X Mobile Menu". Otherwise, send any of the short codes below to short code '12345' (RESTAURANT X) to place your order." Such short codes could for example correspond to meals on the menu. The profile thus provides a clear and easy to use menu system allowing the user to order several menu items of various sizes including, for example, special order information (e.g., no onions on a hamburger order). By contrast, a standard text-based menu order system is restrictive (e.g., perhaps only certain meal combinations may be ordered). In an embodiment, such a mobile menu includes a RESTAURANT X menu background as well as branded images and logos, etc., thus enhancing the user experience and branding potential.

7) Within the application 104, the user browses a listing or catalog (resident within the application 104) of profiles available for downloading to the user's text-messaging device 102. The listing or catalog may be downloaded to the user's text-messaging device 102 at the time the user downloads the application 104. The listing or catalog can be updated in full or with respect to changes/additions to the listing or catalog each time the user downloads a new profile, an updated profile, or an updated version of the application 104 or when requested by the user. The listing or catalog can be updated periodically and automatically, or at the request of the user with or without prompting from the application 104 for the update. In an example, the profile listing is updated each time the user downloads a profile regardless of what download method is used (e.g., via the website, via the application profile listing or via sending a specific code with a short code). The profile listing can be downloaded in the form of an "incremental" profile listing after the first download to conserve memory and reduce the download time and data size.

8) An existing text-messaging system 112 provides an option to download a profile for the text-messaging system 112. For example, the text-messaging system 112 may respond to the request "download profile" sent to the corresponding short code by sending a link to the profile. In this case, if the user already has the application 104 loaded on the user's text-messaging device 102 then a link to the profile will be returned and if the user does not already have the application 104 loaded on the user's text-messaging device 102 then a link to the profile and application together will be returned. This is possible because the test messaging server 110 and text messaging system 112 will in such example have records as to which text messaging devices 102 have the application 102 loaded and which do not (based on received phone number for text messaging device 102). In another example, a user may be prompted as follows: "Please respond with Y to download the mobile application or profile for this text-messaging system."

9) A dedicated toll-free number (e.g. an "800" number) is available for the purpose of providing profiles to users of an application 104. A user calling into an associated interactive voice response system is given options to identify profiles of interest and to download them to the user's text-messaging device 102 via methods described.

10) A profile is transferable from one user directly to another user via Bluetooth, Infrared Data Association, Near Field Communications, or any other device to device communications capabilities, for example, or using a PC as an intermediary.

11) A profile or profiles 106 and the application 104 are loaded onto the text-messaging device 102 by the device manufacturer, distributor, or cellular service provider. In this case, a profile configured to allow access to information, content, and transactions for the cellular service provider can be included.

12) The application and/or profiles are loaded via a SIM card or via any other removable storage device.

13) The application and/or profiles are loaded from a kiosk or other fixed terminal.

14) The profiles are loaded using a Near Field Communication (NFC) connection at a point-of-sale or elsewhere.

15) A profile 106 is sent to the text-messaging device 102 via SMS where the information to describe the profile 106 is contained in one or more SMS messages. In this case, the profile may rely on stored template and other information so that the description is compact, given typical size constraints of SMS messages.

16) A group of all or some of the available profiles are downloaded with a list of the available profiles so that the user can make a request at some time in the future from the user's text-messaging device to begin using a profile going forward. In this case, the profile is made available to the user from within the application 104. Such a group of profiles may be downloaded periodically to the user's text-messaging device 102. This approach eliminates the need for a user to download a profile each time the user wishes to begin using a particular profile. The group of profiles not yet in use by the user can be stored in compressed form on the user's text-messaging device 102 or on removable media coupled to the user's text-messaging device 102 until such time as the user requests use of the profile.

17) A profile may be loaded by scanning a bar code using a bar code reader resident within text messaging device 102 or within application 104. Such bar code reader may leverage the camera component of the text messaging device 102. Because the nature of the profiles of the present invention can result in profiles which are very compact in size, such a technique of profile (i.e. application) download to a text messaging device 102 is possible using available bar codes and in particular two dimensional bar codes (e.g. PDF417 bar codes or Datamatrix or other bar codes) which typically support much higher information content sizes (i.e. bytes of data). Note that the ability to download an application using a bar code is a significant improvement in respect to mobile phone application download options available today.

18) Additional methods for profile and application download and transfer and their respective benefits will be obvious to those skilled in the art.

It will be appreciated that numerous methods for a user to download the application and associated profiles exist. Such availability further promotes the user's ability to identify and access information, content, and transactions available through text-messaging systems. Any combination of the above example methods for loading the profiles onto the user's text-messaging device 102 may be deployed. While some download methods described above refer only to downloading profiles, the methods are applicable to downloading the application as well.

Practical Download Mechanisms

It will be appreciated that there are many possible download mechanisms for the application 104. The application 104 may be large enough that a data connection or a cable connection (sideload) may be required.

Downloading may typically be performed after the text-messaging device operator and make/model are determined. The specific text-messaging device API is then determined and the text-messaging device 102 is made accessible via text messaging. With the device API determined, the appropriate files for application 104 may be selected and the download may take place. The text messaging server 110 or other website/server from which the application 104 will be download may, in some cases, interrogate or otherwise determine the text messaging device 102 make, model, OS, wireless service operator and other characteristics which may then be used to determine the device API and determine the appropriate files for application 104 may then be selected.

Example download options for the application 104 include the following (in addition to those described above):

1) A user performs a sync operation between the text-messaging device 102 and a PC (sideload). The user downloads the application 104 to the PC. Once the application is loaded using the sync operation, the user selects the application 104, causing it to be installed on the text-messaging device 102.

2) The user performs a download using a data connection to a mobile WAP/web site after initiating the download and receiving the WAP/web site address via SMS message or other means. Such initiation of the download may be done for example:

a. through the server/website: The user provides a phone number for the user's text-messaging device 102, wireless service operator, and device make/model through the server/website. When the user accesses the WAP/web site using the text-messaging device 102, then to the extent the user's text-messaging device make/model is determined by the WAP/web site, this information need not be provided through the server/website; or b. by sending a text message to a server: The user provides the make/model of the text-messaging device 102 in the text message. The device number of the user's text-messaging device 102 and operator may typically be determined from the text message.

To perform the download, the user receives a text message or other message containing a URL for a WAP/web site where the application 104 resides. The user enters the URL in a browser or selects the URL link, causing a browser to open and the URL to be accessed. The user may be prompted by the WAP/web site to initiate the download. Once initiated, the application is downloaded to the text-messaging device 102. The user may then select the application 104 install file(s), causing the application 104 to be installed on the text-messaging device 102, after which the application 104 may be run by the user.

Generic Profile Support

Various generic profiles may be created and supported. A generic profile is a profile which is not specific to a particular text-messaging system 112, but which enables text-based transactions with several text-messaging systems. A generic profile can be useful when, for example, several companies/brands use identical codes to perform text-based transactions.

In an example, two movie theaters, one a THEATRE X with 12 screens and one THEATRE Y with 24 screens, use the codes in the body of an SMS message for a ticket reservation transaction, including a theater location code, a theater number, a show time, a number of adult tickets, a number of child tickets, a number of senior tickets, and "today" or a date using MMDD. An example SMS message for a reservation transaction for a theater with theater location code 17, for 2 adults, 4 children, and 1 senior ticket, for theater screen number 5, playing at 5:20 today might be "17 5 520 2 4 1 today." Assuming a menu which reads: "Use your Movie Theater Profile to purchase tickets via SMS using the short code 54321 ("THEATRE X") or use the menu system below to purchase tickets via SMS using your SMS client," a description of the codes and message formats for ticket reservation may then be provided.

The user runs the application 104, selects the movie theater profile, then navigates the menu tree, which prompts the user for the theater location, the number of each type of ticket, the theater screen number, the show time, the day and the short code (e.g., 54321 for THEATRE X). Generic profiles and associated codes and message templates can be provided to customers who may then opt to use the generic profile, or, alternatively, create a custom profile.

The use of a generic profile is advantageous in that many users may already have access to the generic profile at the time a particular movie theater owner decides to provide movie ticket reservations via text messaging. If the owner creates a custom profile then it takes valuable time for users to download the custom profile, causing the number of users capable of purchasing tickets using the system to be undesirably small.

Generic profiles may be created for several types of common text-based transactions. As described above, a company may opt to use a generic profile, or use a custom profile including images for purposes of branding, both using the generic templates/codes.

A semi-custom profile is a generic profile with a template and codes, further customized through additional information. Using the movie theater example above, when the user runs the application 104 and selects the movie theater profile, the user may be first prompted for the theater short code (e.g., 54321 for THEATRE X). The application 104 then sends a text message containing the theater location code to the short code 54321 to retrieve the customization information, e.g., the number of theater screens, theater name (e.g., "THE-ATRE X"), and a promotional Banner (e.g., "Welcome to THEATRE X").

Alternatively, the text message containing the theater location code and the THEATRE X short code can be sent to a different short code to retrieve the information. Alternatively, the THEATRE X short code can be recognized by the application 104 and the customization information can be retrieved from memory rather than received over the air using a text message. Once received or retrieved, the customization information is used to further customize the movie theater profile. The user can then navigate through a set of prompts to make the movie ticket reservation.

Profile Customization

In an embodiment, a profile 106 provided to a user may contain information specific to the user. In an example of a bank profile, the user's account number and account suffixes for savings and checking accounts, for instance, can be included in the profile as entry shortcuts so that the user sees the shortcuts on first using the profile. This user specific profile generation is advantageous to the user in that the frequency of errors in user data entry is reduced, adding to the convenience of the application 104.

In another embodiment, when a user sends a text message using a standard client available on the user's text-messaging device 102, the application 104 may monitor the user's entry sequence and prompt the user the save certain of the entries as sequence shortcuts. In such cases, the application 104 can auto-generate a profile 106 containing the sequence shortcut and prompt the user to name the profile and the sequence shortcut so that the next time the application 104 is run, the user has access to the sequence shortcut and profile. The user may opt to save or not save the sequence shortcut.

A message "compose mode" may be provided within the application 104, allowing a user to compose the text messages for text-messaging systems for which no profile is available, or for which the user has not loaded an associated profile. The compose mode can provide the user with at least some of the conveniences available when a profile is available for accessing the text-messaging system. The compose mode provides the user with access to a standard text editor and some or all of the user's account information and other information and the user's entry shortcuts entered in other profiles. Access to the information is by means of a hierarchical or other menu tree, or other menu structure. The user can use the menu means during composition when inserting such user information into a text message.

In an embodiment, new information entered while composing a text message, can be captured by the application 104 and saved in the form of entry shortcuts for future use. The user need not have a profile associated with the text messaging system 112 for which the text message is composed. The user may also choose whether or not any such new information is saved as an entry shortcut. As described above, user and other information entered when using a profile may be available to the user while composing a message using the above described "compose mode" of the application 104. In compose mode, the user can use the application 104 for any text messaging purpose, including interfacing with a text-messaging system 112, or for sending and receiving text messages to and from individuals. Accordingly, the user need not use the existing client.

Text-Messaging System Detailed Operational Description

Once the application 104 and one or more profiles 106 are loaded onto a user's text-messaging device 102 and the application 104 is set up according to the user's preferences, the user may make use of the application 104 and features. Following are example embodiments including steps the user may take to access the system and a description of the operation of a typical text-messaging system 112.

Menu Navigation and Data Entry

In an embodiment, the user runs the application 104 and selects a profile 106 from a list of available profiles loaded on the user's text-messaging device 102. The profile will typically be selected from a profile list view. Also, from this profile list view, the user may have various options with which to manipulate a selected profile (e.g. delete profile, create launch icon for profile, revert to un-customized profile, etc.). Once a profile 106 is selected, a first menu or display is provided to the user. The user may then select from available menu items using appropriate keys on a user keypad, or enter data requested on the display. For example, up and down keys of a 5-way navigation function on the text messaging device 102 may be used for selecting from the list of menu items and for scrolling list should all of the menu items not be visible on the screen.

The application 104 may provide a "seek" feature such that the first menu item (including profile name if at the profile list view) starting with a given letter combination may be accessed quickly when the user enters the characters on a QWERTY keypad. Or, the user may select such letters on a standard phone pad key by selecting the number corresponding to a set of letters (e.g., 6 for M/N/O, or 2 for A/B/C, etc.) in which case the application will find the first potential matching menu item. A 5-way navigation function typically includes a middle button for entering the selected menu item.

When menu items are selected, the application 104 records the user's selections for future use and displays the next menu list or display for the user. Some menus may include prompts for user input such as user account number, user PIN, user credit card number and expiration date, zip code, dollar amounts for account transfers, dates, times of day, social security numbers, phone numbers, other numbers and values, etc. When the application 104 prompts the user for such entry information, the application 104 provides an appropriate and convenient user entry mechanism so that the user may enter the required data.

The user input may be formatted as it is being entered by the user so that the user may see clearly see that the input being provided is correct. Such formatting may include dollar signs, decimal points, indications of month, day and year entries, etc. The application 104 can perform a check for errors in the user input (incorrect characters, too many digits, too few digits, incorrect values, etc.) to the extent such limitations are known at the time the profile is created and are based on requirements of the text-messaging system 112. The application 104 can detect the entry of such incorrect data and prompt the user to correct the entry before moving to the next menu list or entry display or reject the entry so that it is not accepted by the application. Appropriate error and warning pop-ups and audible alerts may be used to assist in the process. When appropriate, the application 104 may provide pop-up calendars, pop-up alpha-numeric entry pads, and other pop-up applications or other user interface mechanisms to facilitate quick, error free, and convenient data entry. For entry items which may be considered private by the user, the application 104 may hide the entry (e.g., substitute a "*" symbol for the digits of a PIN, and all but the last 4 digits of credit card numbers, etc.).

The user may continue through several menu lists and/or entry menus until the application 104 has collected the information required to create the text message corresponding to the user's information request, purchase or transaction. In an embodiment, an optional prompt is presented to ensure that the user wishes to send the request. The application 104 prepares the text message and sends it to the text-messaging system 112. Alternatively, the text message is sent to a text-messaging server 110.

Responses to Queries and Transaction Requests

After the text message is sent, and before a corresponding message response is received, the application 104 may be configured to display a message indicating a status such as "Retrieving the Weather," or "Retrieving Data." This display may also include a navigation option such as "Return to Main Menu," enabling the user to return to a prior menu to perform additional queries or transactions, for example. Once a message response is received, the application 104 may flag an internal alert. When this alert is flagged, the application 104 may display an alert menu item or pop-up, such as "Response Received" (set according to the Profile level attributes), which can be displayed at appropriate menu levels, also under control of menu level attributes. In an embodiment, the alert menu pop-up is provided along the option to dismiss the alert and the option to go to the associated received message (e.g. "Read"). On selecting the "Read" option, the user is presented with the received message and in a typical case is transferred to the application inbox view.

The application 104 is typically configured to display the received message response to a query immediately upon arrival. If the data does not fit on the screen, the user can use scroll up/down keys to view text otherwise out of view, similarly to the way in which long menu lists may be viewed. In an embodiment, text messages received from a short code corresponding to a profile 106 and a text messaging system 112 are intercepted by the application 104 and displayed for the user. Text messages from a website/server or the text-messaging server 110 may also be intercepted by the application 104. If the received text messages have information (e.g. certain words, text or characters are know to be contained in the received message corresponding to a message sent) useful in determining which received message corresponds to a query sent, then the information may also be used for association and error detection. When the text-messaging server 110 is used, the application 104 may include a sequence number in a text message query sent to the text-messaging server 110. The sequence number may then be sent back to the application 104 within the message response. This sequencing thus allows received text messages to be uniquely associated with text messages sent as queries. When a one short code is used to send queries to test messaging server 110 in order to access several text messaging systems 112 corresponding to a respective several profiles, each profile may use a unique keyword (e.g. the profile name) in the outgoing query text message to identify which of the text messaging systems 112 the query is intended for. Then correspondingly, when a response is delivered in association with such query by text messaging system 112 to text messaging server 110, text messaging server 110 may include the same keyword in such response before passing such response back to application 104. In this way, the queries sent from application 104 for a variety of profiles may share the same short code and the responses to such queries may be uniquely associated with the correct profile. Further required association for query/response message pairs sent from the same profile may utilize the additional methods described above (such as matching to expected text or words in the received message).

The application 104 and profiles 106 may also provide additional formatting information, and graphical images used to enhance the display of information in the received message (e.g., the use of sun and cloud icons as part of weather information display or Zodiac signs for daily horoscopes).

Shortcuts

While a user is creating a request or transaction using the application 104 and a profile 106, the application 104 may save information entered by the user, referred to as "entry shortcuts." When the user completes the creation of the request or transaction, and a corresponding query is sent, the application 104 saves the sequence of steps and information entered by the user. The saved sequence is referred to as a "sequence shortcut." Entry shortcuts and sequence shortcuts provide further convenience to the user and serve to speed transactions performed by the user and reduce the frequency of user entry errors.

In an embodiment, an entry shortcut appears in the entry menu corresponding to the particular profile 106 in which such entry shortcut was created the next time the user enters such menu. In an example, the user enters an account number "123456789" at an entry menu, and the value is saved as an entry shortcut. The next time the user reaches such entry menu, the entry shortcut shows up as a "menu item" (e.g. "123456789"). The user is given an option to select this entry shortcut, select another entry shortcut (if any), or enter another account number in an entry box.

In another embodiment, the application 104 may "propagate" or "copy" entry shortcuts to other entry menu levels within the profile 106. For example, if the example account number entry shortcut above were created at a certain entry menu level in a particular profile 106, then, according to attributes in the profile 106, the entry shortcut could be copied to any or all other entry menu levels within the profile 106 at which the user may be prompted for the account number. In another embodiment, the entry shortcut may be propagated into the entry menu levels of one or more other profiles on the user's text messaging device 102 according to additional parameters in the profile 106 and/or parameters in the other profiles.

In an embodiment, entry shortcut information may be saved for user entry items comprising fixed information such as account numbers, etc. For variable information, such as a dollar amount or a date, the information may not be saved as entry shortcuts under control of the profile attributes.

In another embodiment, the application 104 allows the user to designate certain variable user entry items as fixed for purpose of saving them as entry shortcuts and for purposes of creating certain sequence shortcuts. This designation allows, for example, an entry shortcut to be generated, which provides for the transfer of a fixed amount (e.g. $1,000.00) from one account to another and the amount to be used in a sequence shortcut without prompting the user for input when the sequence shortcut is executed. The user is in this example, effectively overriding the designation of a variable type value to make such value a fixed type value.

The application 104 may also allow the user to designate certain fixed user entry items as variable at the time of entry and during creation of a sequence shortcut. The entry item designated as such will not be saved as an entry shortcut. This allows, for example, generation of a sequence shortcut which provides for local traffic information by prompting the user for the user's current ZIP code (e.g., 92805) instead of using the ZIP code entered when the sequence shortcut was created. The two designations described above allow entry values initially designated as fixed to be variable for use in sequence shortcuts, and likewise for entry values initially designated as variable to be treated as fixed for saving as entry shortcuts and for use in sequence shortcuts.

After it is created, a sequence shortcut will appear in the first menu list or display presented to the user the next time the associated profile is selected. If selected, the sequence shortcut runs automatically from start to finish. If there are no user prompts for variable entry information, then the sequence shortcut can execute the steps for sending a text message corresponding to the request or transaction performed when the sequence shortcut was originally created. Alternatively, the user may be prompted before such a text message is sent. If there are user prompts for variable entry information, then the sequence shortcut can execute all of the other steps, stopping only to prompt the user for such variable entry information, before continuing on to execute the sequence shortcut through to the step of sending a text message corresponding to the request or transaction performed when the sequence shortcut was originally created. Alternatively, the user may be prompted before such a text message is sent.

In an embodiment, the entry shortcut and sequence shortcut information is included in the profile file, or it may be included in one or more separate files. This separate file option, among other benefits, allows the sequence and/or entry shortcut information to remain on text messaging device 102, and to be retained for the user unmodified when and if the user downloads a new version of such associated profile which would necessarily require the removal of the original profile.

In an embodiment, an "auto-entry shortcut" is provided. The auto-entry shortcut allows a user to indicate that a particular menu item in a given menu list is always to be selected at that menu list level. For example, if the user is asked to select between English and Spanish at a certain menu list level, the user may choose English and indicate that this selection is to be made each time this menu list is encountered. An auto-entry shortcut may similarly be configured for a user account number which is unlikely to change, but which must be entered each time the user reaches a certain menu level. The application 104 would then automatically make the desired selection each time the menu list is presented. The user can indicate that an auto-entry shortcut is to be used by selecting the desired item at a certain menu list level, selecting a predetermined option menu or key, and then selecting an appropriate option.

Scheduled Transactions

In an embodiment, the application 104 allows a user to schedule a sequence shortcut to be run once at a later time or on a recurring basis in the future. Using such a "scheduled transaction," the user may, for example, schedule a transfer of funds from the user's checking account to a savings account at a particular time and date. The application 104 determines at the appropriate time that the scheduled transaction is to be triggered, and executes the selected sequence shortcut. The application 104 may be configured to provide a confirmation to the user that the scheduled transaction was performed. The user may be prompted for the transfer amount or to accept the transaction before its execution is completed. The scheduled transaction may also be configured to alert the user just prior to execution of the scheduled transaction. For example, the scheduled sequence shortcut may only be executed after the user is first interrupted (e.g., by an audible alert from the text-messaging device 102) and the user approves of the sequence shortcut to be run.

Scheduled transactions may be set to run with a specified recurrence (e.g., each Monday at 8:00 a.m., each evening at 6 p.m., each weekday morning at 5:30 a.m., etc.). Such scheduled transactions make repeated accesses to information more convenient for the user. A user may wish to receive certain stock quotes each weekday morning at 7:00 a.m., or receive traffic information for the user's route to work each weekday morning at 7:30 a.m. The capability to schedule transactions with a test messaging system 112 advantageously simplifies the configuration of recurring requests for information. While the example provided above involves text messaging systems 112, scheduled transactions of the type described may be implemented using other communication and/or data systems.

Menu Item Ordering

In an embodiment, each time the user utilizes a profile 106, the application places the menu items in each menu list at each level in the menu tree in order of frequency of use such that the most frequently selected menu items subsequently appear at the top of the menu list. After an entry shortcut or sequence shortcut is created, it is placed at the top of the appropriate menu list as if it were the most frequently used menu item and may or may not thereafter be ordered according to the future frequency of use. Initially, the ordering follows an order provided in the original profile 106. It will be appreciated that other ordering methods are possible and may be employed. The user will have the ability to disable further menu reordering and to revert to the original profile ordering using application settings.

Language Support

The application 104 is advantageously suited to support multiple languages because the user interface is in substantially in a written/textual form. In this way, for example, languages not effectively supported by a test messaging system (e.g., the message formats are provided only in English) may be supported by the application and associated profile. When a text messaging server 110 is employed, the server 110 may be configured to convert received responses to the language desired and indicated by the user. The user's language indication may be known by the server 110 from the user's registration information, or it may be provided by the user in the generation of each text message query sent by the application 104 and read by the server 110. It will be appreciated that an SMS system is merely one example of a communication channel, and that the above described language support can be implemented using other data and communication channels. When the application and profile are used to communicate directly with the text message system (without the use of text messaging server 110), it is still possible to support languages other than the language that the text messaging system is designed to support. In order to do so, the menu items, prompts, header text, etc. all under control of the profile will need only be entered in the desired language. For menu item lists, the application and profiles provide for a "replacement" value for each menu item to be sent in the query instead of the menu item itself. For example, a list of menu items (California, Nevada, Texas, etc.) may have respective "replacement" values (CA, NX, TX, etc.). The advantage of the "replacement" values is that the UI may provide the user with a user friendly and understandable representation of menu items for selection, while the text messaging system may require or accept a different set of values. In this way, the user experience is optimized and made consistent among and between profiles, while satisfying the requirements of the text messaging system. It may be easily seen that using the "replacement" values, selected menu items in one language, provided for the benefit of the user, may result in queries sent which contain values in a seconds language (i.e. the language of the text messaging system). It is also worth noting that the present invention will allow for the creation of several profiles, each representing a different user language, each capable of interacting with the text messaging system which is itself supporting a single base language. The user, when selecting profiles for download would be allowed to select profiles based on language among other criteria discussed previously. In is also worth nothing that a single profile may support multiple languages. In one example, the first menu of such a multi-language profile would contain a list of the supported languages for the user to choose from. Once, selected, the menu tree extending from such initial menu in the menu tree would thereafter contain menu items, headers and prompts in the selected language.

Branding

Because the application 104 may be configured to provide users with access to the text messaging systems of corporations and other such entities, there is a significant opportunity to leverage the features of the text-messaging device 102 for enhanced access to such text messaging systems. For example, corporations and entities maintaining these text messaging systems may present promotional, advertising, and branding information to users by way of the application 104. Accordingly, the application 104 can be configured to provide features addressing the promotional, advertising, and branding interests of these corporations and entities. For example, when a profile 106 is utilized, the application 104 may display a background image at each screen developed and/or approved by the corporation or entity (e.g. a corporate logo).

In an embodiment, a corporate logo or other image may be placed at appropriate locations within a menu system (such as in the top or primary header at each screen) supported by a profile 106. Text bars and scrolling banners may also be displayed for promotional or advertising purposes at appropriate locations within the menu system. Additionally, backgrounds for the menu system and certain tailored audible indications (such as an indication of menu item selection/entry) may be designed according to the branding interests of the corporation. For example, a "cha-ching" sound linked to menu item selections could be supported by a profile 106 for a bank.

In another example, a company logo may be used in the profile listings within the application 104. A company logo may also be used as a launch icon for shortcuts and profiles placed in the program launch screen on the text-messaging device 102. Without an application 104, or some other dedicated application, there are no conventional means by which an owner of a text messaging system 112 can provide such branding images in connection with a user's messages intended to retrieve information and process transactions using the text messaging system 112. In an embodiment, the text messaging system 112 is an SMS system. In another embodiment, the text messaging system 112 is implemented using one or more other communication and/or data channels.

Text Messaging System Modifications

While the application 104 may access many existing and future text messaging systems 112 with no modification to the text messaging systems, certain advantages and additional features may be realized when changes to many text messaging systems are made. The following examples are described with respect to modifications made to an SMS text messaging system, where the application 104 sends messages to the SMS system directly:

1) A modified SMS system may provide feedback to the application 104 to acknowledge receiving input from the application 104. The modified SMS system may also provide feedback to the application 104 indicating that an error condition has occurred (e.g., a user data entry input such as a user account number is invalid). It will be appreciated that other methods may be employed for further protection against error conditions.
2) A modified SMS system may provide information as to the revision number of the SMS system being accessed to determine if the SMS profile 106 residing on the text-messaging device 102 is out of date with respect to the SMS system. The user may be prompted to update the SMS profile prior to accessing the SMS system using the SMS application.
3) A modified SMS system may track and log messages sent to the SMS system from the SMS application for billing purposes.
4) A modified SMS system and its associated SMS system creation modules can be modified to output information in the form of menu formats and trees, user entry fields, data files, etc., to avoid having to reverse engineer the SMS system to create SMS profiles. Such output from the SMS system or SMS creation modules can be post-processed to generate all or part of an SMS profile.
5) A modified SMS system may periodically send information via SMS messages to the user's text-messaging device 102, which are used by the application 104 to change or augment information already contained in the user's SMS profile 106 corresponding to the modified SMS system. For example, an SMS profile 106 for a cinema may receive periodic updates to provide information as to specific movies and the show times. Also, minor changes, updates and corrections to an SMS profile may be sent in this way.

Other Applications

Embodiments of the present invention may be implemented for other applications:

In an embodiment, the application 104 and associated profiles are used to control a television or multimedia system. An infrared port available on many text-messaging devices 102 is used to transmit appropriate commands to the multimedia system. Alternatively, a Bluetooth port (or other wireless port) available on many text-messaging devices 102 is used to transmit appropriate commands to the multimedia system either directly, or via a remote unit configured to convert Bluetooth commands to appropriate infrared commands. In such an application, a set of menus can be provided which allow the user to select any of multiple components of the multimedia system, and to control the units individually. The sequence shortcut feature described above allows the user to execute complex control sequences to set up the multimedia system for various operational modes (e.g., a satellite TV mode, a cable TV mode, a VCR mode, a DVD mode, etc.). More specific mode control may be provided as well. For example, a sequence shortcut can be configured and appropriately named for setting up the multimedia system and tuning a receiver component to a specific channel.

In another embodiment, downloadable profiles provide flexibility to support a multitude of multimedia systems, components, and modes, including user customization options. In addition to multimedia system control, the application 104 and profile 106 can monitor and track a channel selected by the user, thus enabling further system capabilities. For example, using a UI based on a profile 106, a user may request information regarding a particular TV commercial being shown on the selected channel. When the user requests such additional information, the application 104 may send an SMS message including the selected channel with a timestamp to an SMS server (i.e., text messaging server 112). The server 112 can then identify the TV commercial indicated by the user. The commercial sponsor is notified with appropriate information necessary for it to provide to the user the requested additional information.

In another embodiment, users may purchase products and services though similar means. The additional information requested by the user from the commercial sponsor may include, for instance, a purchase request. Advantageously, such interactive TV capabilities are achieved with little or no interaction with cable and satellite television operators. The application 104 and a profile 106 may also be used for other forms of interactive TV. For example, SMS messages may be sent to control avatars within such TV programs, to vote on endings and other outcomes and actions, select plot choices, and generally influence the course of the TV program.

Profile Contents

A profile 106 is processed by the application 104 on a text messaging device 102 to provide the user with an enhanced ability to interact with a text messaging system 112 (or a text messaging peer 114, or a web service 118 through API 120 via a text messaging server 110). The profile generally defines user interactions and device 102 actions. An application 104 processing a profile 106 on a text messaging device 102 generates an interface according to the profile 106. In one embodiment, profiles are implemented using XML (eXtensible Markup Language).

Profiles can include attributes of various types. Because the profiles are made of predefined attributes types, the application can process any profile which is created using the defined attributes. The attributes describe the UI, for example, as a menu tree and describe the send and receive message formats of the specific text messaging system which is associated with the profile. In one embodiment the attributes can be generally grouped into the following categories: profile level, menu level, menu item, entry action, display action, send SMS action, call action, and URL action attributes. In one embodiment the send SMS action includes sending a message or data via a different communication channel such as a digital packet data channel. The following is an example list of attributes, intended for storage in an XML file, for profiles with a brief explanation of the characteristics of each attribute. The attributes are grouped into the categories listed above.

| PROFILE LEVEL | |
| --- | --- |
| Attribute | Description |
| Profile XML File Name | The profile XML file name is a concatenation of the Profile Name with version and minor version numbers. Profile Name and Version are attribute values included in the Profile. An example file name is "Google v3.00.99." Version numbers are incremented each time a profile is written out in an XML file. Thus, the next revision to the Google profile file name is "Google v3.01.00." |
| CreationDate | Set to the current date when the XML file is written out. |
| ProfileName | ProfileName is the name given by the profile designer (e.g., Profile Name = Google). ProfileName is used in the profile XML file name, the primary header and in web site and application profile lists. |
| ProfileCat | Profile category list. The vertical industry type(s) based on the profile. This is used for ad placement and website profile listing. |
| Version | The current profile version number. |
| Shortcode | List of shortcodes used to receive messages for the profile. The first short code in the list is used for sending messages. |
| ProfileType | The profile type (e.g. SMS profile or IVR profile). |
| LaunchIcon | Pointer to a location and name of the icon which may be placed on the desktop (if DesktopIcon is set to TRUE). |
| DesktopIcon | If set to TRUE, then the application 104 places a launch icon on the desktop in the programs screen. The icon is "LaunchIcon" and the program name is ProfileName. |
| MenuBG | Pointer to a location and name of a graphic used as the background for the screens. |
| PrimHeaderIcon | PrimHeaderIcon points to an image file (e.g. a company logo) used in primary headers. |
| PrimHeaderText | PrimHeaderText (if any) is displayed in the Primary Header to the right of the PrimHeaderIcon (if any). |
| BannerText | The BannerText (if any) scrolls from right to left across the screen, typically above the keypad. |
| MenuReorder | When set to TRUE, menu item reordering takes place. When set to FALSE, no further menu item reordering is performed. |
| AlertText | Text displayed to the user as the left soft keys at all levels when an alert is registered by the application (e.g. when a message arrives). The text is removed when the alert is either cleared or dismissed. |
| PayFor | Text displayed to the user when the profile 106 is loaded in the application 104. Used for profiles where pay for content may be accessed using the profile as a warning to the user. |
| ProfileDescription | Text displayed when the user requests profile Info in the application 104. |
| Regions | Region where the profile is applicable (e.g. USA, India, etc.). |
| RemoveHiddenItems | If set to TRUE, the application 104 does not show hidden menu items. If set to FALSE, the application 104 shows the hidden menu items. |
| InitialId | Attribute in the XML file, indicating the initial menu id. |
| PUC | Profile Usage Count, comprising statistics information maintained internally by the application 104 as to the usage of the profile 106 for sending a query. |
| MSCF | Used by the application 104 for message concatenation. MSCF includes three values: start txt, end txt and separator, which indicates the concatenation format of a multi-part response. When |

PROFILE LEVEL

| Attribute | Description |
|---|---|
| | there are two or more response messages for a single request, it contains a string indicating which part of the message a particular response comprises. |
| LB (LoopBack) | When set to TRUE, the request message sent is looped back as the response to the application 104 by bypassing the SMS channel. |
| DAd (Dynamic Ad) | When set to TRUE, a dynamic advertisement is allowed to be placed in the profile. Either Static Ads or Dynamic Ads or both can be placed in a profile, or none can be placed. |
| SAd (Static Ad) | When set to TRUE, a static advertisement is allowed to be placed in the profile. |
| Interval | Indicates an interval over which profile usage reports are to be collected. |
| Indirect | Indicates that the profile is an indirect profile. The communication is facilitated using the text messaging server 110. For example, this is applicable to a web service 118. |
| Operator | Specifies a list of wireless operators with which this particular profile 106 operates. If the field is empty, the profile 106 operated with all the operators. Allows profiles to be generated for specific wireless operators or to exclude profiles from operation with specific operators. Also, allows customization of profiles on an operator by operator basis. |

MENU LEVEL

| Attribute | Description |
|---|---|
| MenuName | Identifies a unique menu in the profile. When MenuName is referenced in a Query Format, the menu item selected by the user (or menu item "replacement" value if any) within such menu, is used in the Query Format in replace of MenuName. So if the user selects "California" at menu "State Menu", then California (or the replacement value "CA" if CA has been entered as a "replacement" value) will be used in the Query Format. |
| ID | A unique ID used internally by the application 104. |
| SecHdrText | Text (if any) displayed below the primary header. |
| StopSeqSc | If set to TRUE, any sequence shortcut will stop at this menu. |
| Back | When set to TRUE, the application 104 causes a Back key to appear at the current screen. |
| PlaceAd | If set to TRUE, an ad may be placed at this level. At the initial menu level, if set to TRUE, the BannerText attribute is ignored. Otherwise, BannerText is displayed as required. The ad is placed above the keypad. The ad text either scrolls or is centered under control of the ad text attributes. |
| MV (Memorized Variable) | The item text and "replacement" value of a selected item is memorized in Memorized Variable. |
| EscapeText, GotoId | EscapeText (e.g., "Goto Main Menu," if any) is displayed above the ad (if any), or above soft key text. If EscapeText is selected, the application 104 changes to the menu specified by the GotoId attribute. EscapeText can be placed either in options or menu. If EscapeText is set to NULL, no text is displayed. |

MENU ITEM LEVEL

| Attribute | Description |
|---|---|
| Text | Text for the menu item displayed in a menu list. |
| OriginalText | Whenever the item is renamed, the original text value is stored under this attribute. The first time an item is renamed, OriginalText is set to Text so that it is available when the renaming is removed. |
| Hide | When Hide is set to TRUE, the menu item is hidden. |
| ID | A unique ID used internally by the application 104. |
| AccessCounter | Counts the number of times the item is accessed. |
| GoTo | The next ID to be executed. |
| Replacement Value | Value is stored when the item is selected. It is inserted into the message as defined by the Query format. For example, if the MenuName = "States", the menu item selected by the user has Text = "California" and the Replacement Value = "CA" and the QueryFormat is {Info [States]}, then the query will be "Info CA". |

ENTRY ACTION

| Attribute | Description |
|---|---|
| EntryName | Text indicating that an entry value is to be entered (e.g., "Enter Account Number") in the entry box or by selection of an entry shortcut. |
| EntryType | Data type of the entry value. For example, the MMDDYY EntryType is for 6 digit dates, such as 103105 for Oct. 31, 2005. |
| ID | A unique ID used internally by the application 104. |
| SCPrefix | Entry value type information for purposes of entry shortcut generation and propagation. |
| MinChar | If the entry value is variable length, then it is constrained to be greater than or equal to MinChar. Length is set to NULL. |
| MaxChar | If the entry value is variable length, then it is constrained to be less than or equal to MaxChar. Length is set to NULL. |
| Length | If the entry value has a fixed length, then Length is set to the length. MinChar and MaxChar are set to NULL. |
| MaxValue | The maximum allowable entry value. If MaxValue is set to NULL, there is no maximum. |
| Mask | Used to mask indicated characters of an entry value. If the entry type has a variable length, the entire value is masked if Mask is set to '*', and unmasked if Mask is set to '0' or to NULL. If the entry value has a fixed length, then Mask has the same number of characters with '*' representing a masked character and '0' representing an unmasked character. If Mask is set to NULL, no masking occurs. For example, a credit card having Length set to 16 may have Mask set to "************0000." |
| GoTo | The next ID to be executed. |
| Propagate | When an entry shortcut is created from a value entered at this Entry Action, and if Propagate is set to TRUE, then the application 104 opens all other entry shortcut XML files for all other profiles and determines whether the SCPrefix value used in this entry action matches an entry shortcut prefix in each other profile XML file. For each XML file for which there is a match, the application copies the entry shortcut being created into the XML file. This allows for values entered during the execution of one profile to be reused in another profile that can use the same value, for example a zip code. |
| FixedVariable | Indicates whether the entry value is fixed or variable. |
| Back | When set to TRUE, the application 104 causes the Back key to appear at the current screen on the left soft key. |
| PlaceAd | If set to TRUE, an ad may be placed at this level. At the initial menu level, if set to TRUE, the BannerText attribute is ignored. Otherwise, BannerText is displayed as required. The ad is placed above the soft keys. The ad text either scrolls or is centered under control of the ad text attributes. |
| REB (Remove Entry Box) | Specifies whether the entry box is to be removed. |
| PE (Perishable Entry) | Specifies whether the entry shortcut value is to be remembered when the user leaves the profile. |
| MultiLine | If MultiLine is set to TRUE, the entry box is larger to accept multiple lines of characters. If MultiLine is set to FALSE, the entry box has the height of a single line. |
| MSContacts | Specifies whether the phone contact list is to be retrieved and displayed. |
| MultiValue | If MultiValue is TRUE, the value entered is concatenated with (i.e. appended to) the prior values entered using the same SCPrefic value. Used to allow for variable length entries, such as a variable length list of names (e.g. john:raj:dave). |
| Separator | If MultiValue is TRUE, Separator defines the character which separates the values when they are entered by the user (e.g. ":"). |
| MV (Memorized Variable) | The value entered is memorized in Memorized Variable. |
| EscapeText, GotoId | EscapeText (e.g., "Goto Main Menu," if any) is displayed above the ad (if any), or above soft key text. If EscapeText is selected, the application 104 changes to the menu specified by the GotoId attribute. EscapeText can be placed either in options or menu. If EscapeText is set to NULL, no text is displayed. |

DISPLAY ACTION

| Attribute | Description |
|---|---|
| ID | A unique ID used internally by the application 104. |
| DisplayTime | The time (in seconds) that the screen is displayed. If DisplayTime is set to InfiniteDelay, it is displayed indefinitely. If DisplayTime |

-continued

| DISPLAY ACTION | |
|---|---|
| Attribute | Description |
| | is set to WaitForResponse, then the application 104 waits until the message matching associated QueryType parameters is received, or until a fixed timeout period has elapsed. |
| DisplayImage | Indicates what image is to be displayed. Images may be centered on the screen, for example, and text may be top-justified. If DisplayImage is set to SMSMessage, the most recent received message matching associated QueryType parameters is displayed. |
| QueryType | The query type of the message to be displayed (if applicable). |
| GoTo | The next ID to be executed. |
| EscapeText, GotoId | EscapeText (e.g., "Goto Main Menu," if any) is displayed above the ad (if any), or above soft key text. If EscapeText is selected, the application 104 changes to the menu specified by the GotoId attribute. EscapeText can be placed either in options or menu. If EscapeText is set to NULL, no text is displayed. |
| OutputText | OutputText (e.g., "Account Balance") is displayed under the primary header and above the DisplayImage (e.g., "Retrieving Weather"). If OutputText is set to NULL, no text is displayed. |
| PlaceAd | If set to TRUE, an ad may be placed at this level. At the initial menu level, if set to TRUE, the BannerText attribute is ignored. Otherwise, BannerText is displayed as required. The ad is placed above the soft keys. The ad text either scrolls or is centered under control of the ad text attributes. |
| Back | When set to TRUE, the application 104 causes the Back key to appear at the current screen on the left soft key. |
| Info | The information text to be displayed if DisplayImage is set to "Info". No image is displayed. |
| DisableReply | If set to TRUE, no message reply option is present in the options menu. |

| SMS SEND ACTION | |
|---|---|
| Attribute | Description |
| ID | A unique ID used internally by the application 104. |
| QueryType | Indicates the type of the message (e.g., Weather). The QueryType is displayed with the received message in the application inbox when the QueryType is determined through association. Also used to determine which received message is to be displayed in some Display Action Types. |
| QueryFormat | Message format definition. |
| MatchWords | A received message may be associated with a sent message (i.e., the query) when each of the words in the MatchWords attribute are present in the received message. |
| MisMatchWords | A received Message may be associated with a sent message (i.e., the query) when none of the words in the MisMatchWords attribute are present in the received message. |
| GoTo | The next ID to be executed. |
| Short Code | Short code for this particular SMS Send Action. When specified, it overrides the global short code. |
| CheckForNo | Specifies whether the phone number in the response message requires detection. If set to TRUE, phone numbers (if any) are highlighted for dialing. |
| CheckForUrl | Specifies whether the URL in the response message requires detection. If set to TRUE, the URLs (if any) are highlighted for clicking. |
| Propagation | In order to propagate data from received text messages, the application 104 needs to be able to first find the data, then assign the data to a variable (SCPrefix) for propagation. This entry specifies a series one or more sets of information to describe how to find the start of the data (StartText), how to find the end of the data (StopText) and which variable to assign the characters to between StartText and StopText to (SCPrefix) |
| MatchedText | Specifies one or more sets of information for interactivity purposes. The sets of information include 1) a character string for the application 104 to search for in the received text message and 2) a menu id the application should jump to if the user selects the matched text from the received SMS message. |
| KeywordDefinition | Specifies one or more sets of information for interactivity purposes. The sets of information include 1) a character string for the application 104 to search for in the received text message (StartText), 2) a character string for the application 104 to search for after StartText is found (StopText), 3) a variable name to assign |

| SMS SEND ACTION | |
|---|---|
| Attribute | Description |
| | the characters between StartText and StopText to, and 4) a menu ID the application 104 should jump to if the user selects the matched text from the received SMS message. |
| IgnoreText | Specifies one or more sets of information for interactivity/propagation purposes. The sets of information include 1) a character string for the application 104 to search for in the received text message (StartText), 2) a character string for the application 104 to search for after StartText is found (StopText). When StartText and StopText are found in the SMS message, the characters between StartText and StopText are ignored for the purposes of interactivity and propagation. |

| CALL ACTION | |
|---|---|
| Attribute | Description |
| ID | A unique ID used internally by the application 104. |
| Got | The next ID to be executed. |
| Number Format | The number to be dialed is generated from fixed and variable (based on user selections and entry values) components defined by Number Format. |

| URL ACTION | |
|---|---|
| Attribute | Description |
| ID | A unique ID used internally by the application 104. |
| Got | The next ID to be executed. |
| URL Format | The URL to be invoked in the browser is generated from fixed and variable (based on user selections and entry values) components defined by URL Format. |

Operational Flow

Figure 2:
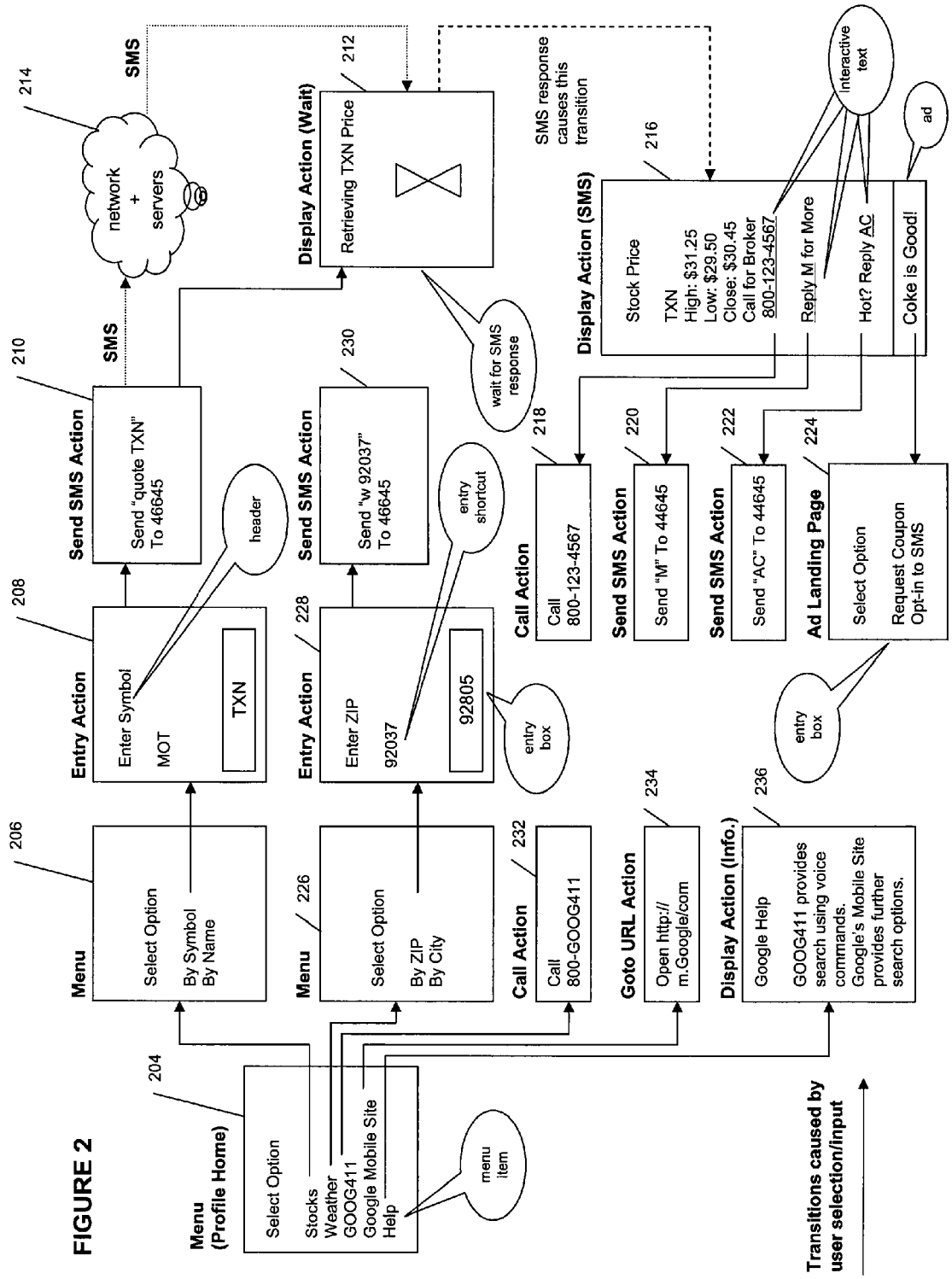
FIG. 2 is a block diagram depicting an example operational flow according to an embodiment of the invention.

FIG. 2 is a block diagram of an example operational flow for an application processing a profile. The actions described below, unless indicated otherwise, are performed by the application 104 processing the selected profile running on a text messaging device 102 depicted in FIG. 1. For purposes of this example, the name attribute in the profile is set to "Google," and the short code is set to "46645." In the example of FIG. 2 described below, a series of interactions and actions are described in order to provide an example of the operation of the systems and methods described herein.

Typically, a user selects a profile to be executed via the UI generated by the application. Additionally, the profile can be selected from a profile list view display that causes the application to begin processing the selected profile. When the profile is executed by the application, a menu 204 ("Profile Home") is generated and displayed according to menu definitions (e.g., attributes described above) in the profile. In the example depicted in FIG. 2, the application generates a number of menu items associated with Google services, including Stocks, Weather, GOOG411, Google Mobile Site, and Help, which are defined in the profile.

When the user selects the Stocks menu item from menu 204, the application 104 generates another menu item list (menu 206) based on the attributes found in the profile. The menu 206 for Stocks includes a header "Select Option" and menu items "By Symbol" and "By Name." The application responds to a By Symbol selection by the user with an entry action 208 which allows the user to make an entry (provide a value). The entry action 208 includes a header, which in this example has the instruction "Enter Symbol." The entry action 208 also includes an entry shortcut for a stock quote displayed as "MOT" which the user can select as the entry. In an embodiment, this entry shortcut is memorized from a previous transaction, where the user specified MOT for a stock quote request. Alternatively, the entry shortcut can be a default attribute in the profile. The entry action 208 also includes a text field at the bottom containing the stock symbol "TXN" entered by the user. In response to the user's entry, the application performs a Send SMS Action 210, which instructs the text messaging device to send the text message "quote TXN" to the short code 46645 associated with Google via the network and servers represented as 214. Alternatively, if the user selects the entry shortcut MOT in the entry action 208 instead of entering a stock symbol, the application responds by generating a Send SMS Action including a request for a quote for MOT stock.

The application next generates a display action 212. The display includes the text "Retrieving TXN Price" (e.g., according to the OutputText attribute for the display action 212). This allows the user to know that the request is being processed.

When a response to the sent message is received, the application generates a display action 216 for an SMS message, which includes the requested stock quote information. As shown, the information may include interactive text such as a phone number ("800-123-4567"), an interactive option (enabled using the MatchText attribute) for more information ("Reply M for More"), an interactive option (enabled using the KeywordDefinition attribute) for information about air conditioning ("Hot? Reply AC"). Additionally, the application 104 may place an advertisement within the display action 216, in this case for a well-known soft drink. The format for the information displayed in the display action 216, including the interactive text options is specified by the attributes in the profile. The advertisement text and actionable options are provided as a dynamic ad via the control channel or as a static ad from a static ad file resident with the application.

If the user selects the interactive text for the phone number 800-123-4567, the application responds with a call action 218 for that number, and uses the number to make the phone call. The application can also use the systems and methods described in U.S. provisional application Ser. No. 60/938, 965, filed May 18, 2007 and titled SYSTEM AND METHOD FOR COMMUNICATING WITH INTERACTIVE SERVICE SYSTEMS, which is hereby incorporated by reference to process the phone call and subsequent interaction more efficiently. Similarly, if the user selects the interactive text "Reply M" for more information, the application responds with a send SMS action 220, and sends another SMS message requesting more information. Likewise, if the user selects the interactive text "Reply AC" for information about air conditioning, the application responds with another send SMS action 222, and sends an SMS message requesting information about air conditioning. If the user selects the advertisement shown at the bottom of the display action 216, another menu 224 functioning as an advertisement landing page may be displayed, with an instructive header (Select Option) and options for the user to request a coupon (Request Coupon) and an option for the user to opt into SMS marketing from the advertiser (Opt-in to SMS).

Referring again to the Profile Home menu 204, if the user selects Weather, the application responds by generating a menu 226. The menu 226 includes the header reading "Select Option," and menu items "By ZIP" and "By City." If the user selects By ZIP, the application generates an entry action 228 for By ZIP. As shown, the entry action 228 includes the header reading "Enter ZIP" and an entry shortcut "92037." The entry shortcut may, for example, be memorized from a previous request, or it may be a default attribute in the profile. If the user selects the entry shortcut 92307 in the entry action 228, the application responds by generating a send SMS action including a request "w 92307" for weather information at that ZIP code, with the short code 46645 associated with Google. The application then sends the message to the short code. The entry action 228 also includes a text field at the bottom for the ZIP code entered by the user. If instead of selecting the entry shortcut 92307 the user enters the ZIP code 92085 in the field, the application responds by generating a send SMS action with a request for weather information at the 92805 ZIP code.

Referring again to the Profile Home menu 204, if the user selects GOOG411, the application responds by generating a call action 232. The call action 232 completes a phone call to number "800-GOOG411". Similarly, if the user selects Google Mobile Site from the menu 204, the application responds by generating a goto URL action 234. The goto URL action 234 opens a browser and connect to the URL "http://m.Google.com". If the user selects Help from the menu 204, the application generates in response the display action 236, which displays the header reading "Google Help," and the additional in Display Action 236.

Figure 3:
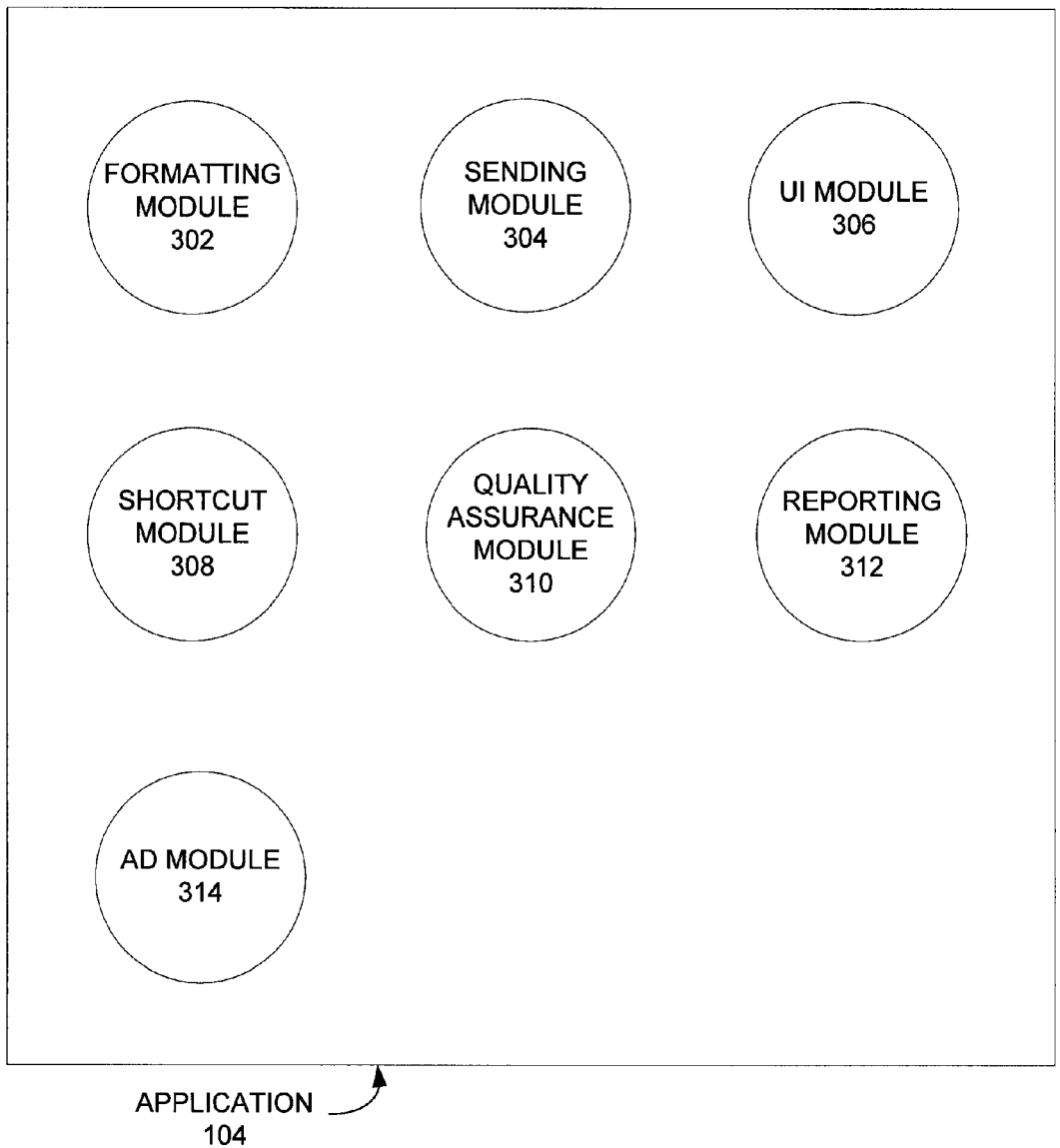
FIG. 3 is a functional block diagram of a text messaging application according to one embodiment of the invention.

FIG. 3 is a functional block diagram of a text messaging application 104 according to an embodiment of the invention. As shown, the application 104 includes at least a formatting module 302, a sending module 304, a UI module 306, a shortcut module 308, a quality assurance module 310, a processing module 312, and an ad module 314. A more detailed explanation of the functions implemented by these modules has been provided above.

The formatting module 302 utilizes formatting attributes in the profile 106 to ensure that data and information are appropriately formatted in text messages and on displays.

The sending module 304 prepares a message for sending, and facilitates sending the message over a communication channel used by the text messaging device 102. In an embodiment, the message is a text message and it is communicated over an SMS channel. Other communication channels may be used, including packet data channels and other types of text messaging channels. In some cases information may be sent over a voice channel (such as a circuit voice channel in a cellular system). In the case of a voice channel, DTMF tones will typically be used for communication between the application and server. The sending module 302 is operable to send messages to recipients specified by information entered by the user, or specified by an entry shortcut in conjunction with the shortcut module 308 (described below).

The UI module 306 implements the UI components, including menus and display actions, according to definitions in the profile 106. The UI module interfaces directly with the API of the operating system of the device 102.

The shortcut module 308 carries out the functions to create shortcuts as was described above. The shortcut module also implements propagation.

The quality assurance module 310 is used to implement error checking.

The reporting module 312 can implement the reporting and tracking functions described above including the watch dog function, operation of the control channel (including the queues) and the maintenance of the inbox.

The ad module 314 facilitates the display of ads, dynamic and static as described above. As mentioned prior, the profile attributes indicate which of the screens of the profile are allowed to display an advertisement. Furthermore, if the profile indicates that a static ad is to be displayed, the ad module selects an appropriate ad (based on the profile category, e.g. banking) from the static advertisement file located on the application. If the profile indicates that a dynamic ad is to be displayed, the ad module displays the received ad from the received text message. In both cases (static and dynamic) the ad module manages the displaying of the ad landing page as well as any actioning of the ads. In addition, the ad module manages the collection and sending of the ad statistics.

Figure 4:
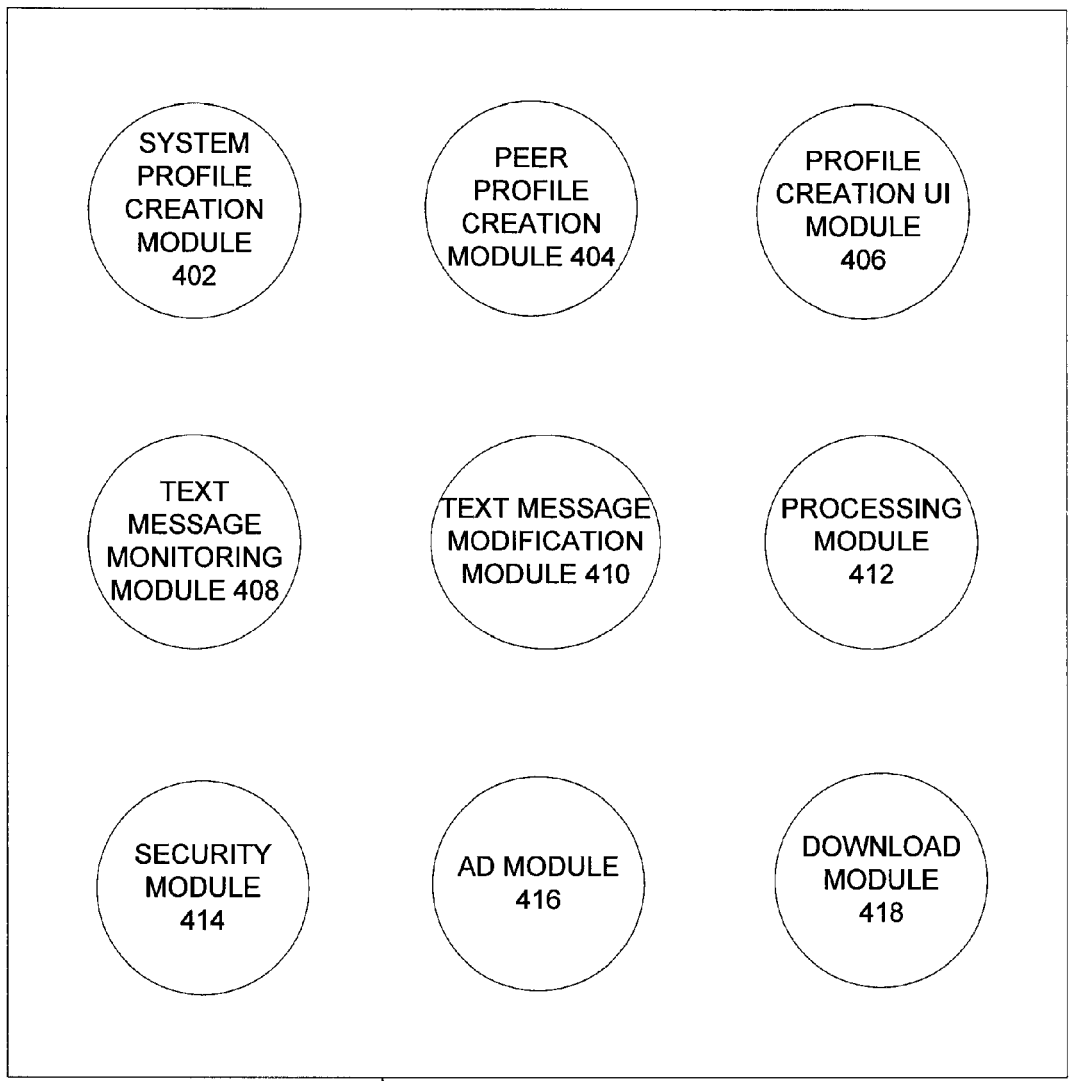
FIG. 4 is a block diagram of a text messaging server according to one embodiment of the invention.

FIG. 4 is a block diagram of a text messaging server according to an embodiment of the invention.

The system profile creation module 402 on the text messaging server 110 allows a profile designer, developer, text-messaging service or content provider, or end-user to create a profile 106 associated with a particular text-messaging system 112. Creation of a profile 106 is performed through a UI provided by the system profile creation module 402, where the UI may include a set of forms, prompts, and entry fields used to receive the information to describe a particular text-messaging system 112. In an embodiment, the information includes send and receive message format information, one or more text-messaging system short codes, user entry prompts, information and constraints for error checking, and information pertaining to the desired UI, generally in the form of a menu tree.

Similar to the system profile creation module 402, the peer profile creation module 404 on the text messaging server 110 allows a profile designer, developer, text-messaging service or content provider, or end-user to create a profile 106 associated with a particular text-messaging peer 114.

The profile creation UI module 406 facilitates profile 106 creation through a UI provided by the system profile creation module 402 and/or by the peer profile creation module 404, where the UI may provide a graphical representation of the profile menu tree to facilitate development and maintenance of the profiles. The profile creation UI module 406 may also provide a set of forms, prompts, and entry fields used to receive the information to define a profile to represent a particular text messaging peer 114. In an embodiment, the information received includes send and receive message format information, one or more text-messaging system short codes, user entry prompts, information and constraints for error checking, and information pertaining to the desired UI, generally in the form of a menu tree.

The text message monitoring module 408 can monitoring received communications to determine which require further processing by other modules. The text message modification module 410 can implement the functions relating to one to many sending, compression, decompression described above. The security module can implement the security functions such as related to user profiles. The ad module 416 can implement the ad related functions described above. The download module implements the described download functions. Other functions described above can be implemented by the processing module 412.

Those of skill will appreciate that the various illustrative logical blocks, modules, and algorithm steps described in connection with the embodiments disclosed herein can often be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular system and design constraints imposed on the overall system. Skilled persons can implement the described functionality in varying ways for each particular system, but such implementation decisions should not be interpreted as causing a departure from the scope of the invention. In addition, the grouping of functions within a module, block or step is for ease of description. Specific functions or steps can be moved from one module or block without departing from the invention.

The various illustrative logical blocks and modules described in connection with the embodiments disclosed herein can be implemented or performed with a general purpose processor, a digital signal processor (DSP), a text messaging system specific integrated circuit (ASIC), a field programmable gate array (FPGA) or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration.

The steps of a method or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium. An exemplary storage medium can be coupled to the processor such that the processor can read information from, and write information to, the storage medium. In the alternative, the storage medium can be integral to the processor. The processor and the storage medium can reside in an ASIC.

Various embodiments may also be implemented primarily in hardware using, for example, components such as text messaging specific integrated circuits ("ASICs"), or field programmable gate arrays ("FPGAs"). Implementation of a hardware state machine capable of performing the functions described herein will also be apparent to those skilled in the relevant art. Various embodiments may also be implemented using a combination of both hardware and software.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are therefore representative of the subject matter, which is broadly contemplated by the present invention. It is further understood that the scope of the present invention fully encompasses other embodiments that may become obvious to those skilled in the art and that the scope of the present invention is accordingly limited by nothing other than the appended claims.

The invention claimed is:

1. A method for operating a wireless mobile device to interact with an interactive service system using a wireless communication channel, the method comprising:
receiving at the mobile device a user's selection of a profile stored on the mobile device;
the mobile device processing the selected profile, the profile associated with an interactive service, having user interface information associated with the interactive service, the user interface information including information to be displayed on the mobile device and having information specific to a messaging peer for enabling communications with the messaging peer through the interactive service via the mobile device;
generating and displaying a user interface at the mobile device based on the user interface information including displaying at least some of the information to be displayed from the profile, the user interface soliciting a user input comprising a communication for the messaging peer;
receiving the user input via the user interface at the mobile device;
the mobile device processing the user input in accordance with the profile to generate a message;
sending the message to a communication address associated with the profile, the message including an identification of the messaging peer;
receiving a message at the mobile device from the interactive service; and
after receiving the message from the interactive service, updating the user interface at the mobile device based upon the responsive message.

2. The method of claim 1, wherein the profile includes an image.

3. The method of claim 2 further comprising displaying on the mobile device the image contained in the profile.

4. The method of claim 1, wherein the communication address associated with the profile is a communication address for the interactive service.

5. The method of claim 1, wherein the step of processing the profile further comprises executing a profile processing application.

6. The method of claim 1, further comprising determining whether to send the message via a short message service (SMS) or a data channel.

7. The method of claim 1, further comprising granting the interactive service access to a contacts list of the user in the mobile device.

8. The method of claim 1, wherein the message from the interactive service includes a communication from the messaging peer.

9. The method of claim 7, further comprising determining for each contact in the contacts list whether a profile is available.

10. The method of claim 9 further comprising sending a profile to the mobile device for a contact in the contacts list.

11. The method of claim 9 further comprising sending a list to the mobile device of contacts in the contacts list for which profiles are available.

12. The method of claim 1, further comprising receiving user input identifying a group of messaging peers and wherein the message includes a communication for the group of messaging peers.

13. The method of claim 12, further comprising the interactive service determining the communication addresses of each member of the group of messaging peers and sending the communication on to each member of the group.

14. The method of claim 1, wherein sending the message to the communication address associated with the profile comprises sending the message via a short message service (SMS) or a data channel.

15. The method of claim 1 further comprising creating a profile associated with the user.

16. The method of claim 1 wherein the communication for the messaging peer comprises an emoticon.

17. The method of claim 1 further comprising sending a message to a messaging peer via a short message service (SMS).

18. The method of claim 1 wherein the profile is a peer to peer profile and further comprises a name and mobile telephone number associated with the messaging peer.

19. A mobile device having a system for interacting with an interactive response system via a wireless communication channel, the mobile device comprising:
a profile processing application which processes a profile stored on the mobile device and associated with an interactive response system, the profile having user interface information associated with the interactive response system including information to be displayed, and having information specific to a messaging peer for enabling communications with the messaging peer through the interactive response system via the mobile device;
a user interface module configured to at least
receive at the mobile device a user's selection of the profile stored on the mobile device,
generate a user interface based on the processing of the profile, including displaying at least some of the information to be displayed from the profile, the generated user interface soliciting a user response correlating to an input for the interactive response system,
receive the user response via the user interface, the user response comprising a communication for the messaging peer,
process the user response in accordance with the profile, and
a sending module which generates a message based on the user response and based on the profile and sends the message, including an identification of the messaging peer, to an address associated with the profile.

20. The mobile device of claim 19, wherein the sending module is further configured to send the message to the communication address associated with the profile via a short message service (SMS) or a data channel.

21. The mobile device of claim 19, further comprising a formatting module configured to parse, format and display a responsive message received from the interactive response system, the formatting and displaying taking into account information in the profile.

22. The mobile device of claim 19, wherein the address associated with the profile is a communication address for the interactive service.

23. A method for a mobile device to interact with a plurality of messaging peers via an interactive communication system using a wireless communication channel, the method comprising:
receiving at the mobile device a user's selection of a profile stored on the mobile device, the profile associated with an interactive communication system for communicating with one or more messaging peers and wherein the profile defines one or more menus configured to provide choices to a user of the mobile device for interacting with the associated interactive communications system;
processing on the mobile device the selected profile;
generating at the mobile device a user interface including displaying the one or more menus defined in the profile based on the processing of the profile to solicit at least one user response correlating to a response for the interactive communication system;
receiving the at least one user response via the user interface identifying a messaging peer;
the mobile device generating and transmitting a message, via the wireless communication channel, to the interactive communication system based on the at least one user response and information in the profile and includes a communication for the messaging peer;
receiving, at the mobile device, a responsive message from the interactive communication system; and
the mobile device updating the user interface based on the responsive message and information in the profile.

24. The method of claim 23, further comprising creating a profile associated with a messaging peer.

25. The method of claim 23, further comprising granting the interactive service access to a contacts list of the user in the mobile device.

26. The method of claim 23, wherein transmitting a message, via the wireless communication channel, comprises sending the message via a short message service (SMS) or a data channel.

27. The method of claim 23, wherein the responsive message includes a communication from the messaging peer.

* * * * *